(12) United States Patent
Ikeda et al.

(10) Patent No.: US 12,503,154 B2
(45) Date of Patent: Dec. 23, 2025

(54) REDUNDANT RESOLVER AND ELECTRIC POWER STEERING DEVICE MOUNTED THEREWITH

(71) Applicant: Mitsubishi Electric Corporation, Tokyo (JP)

(72) Inventors: Hiroko Ikeda, Tokyo (JP); Tatsuya Mori, Tokyo (JP); Toshihiro Matsunaga, Tokyo (JP); Kenji Ikeda, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 952 days.

(21) Appl. No.: 17/761,491

(22) PCT Filed: Nov. 18, 2019

(86) PCT No.: PCT/JP2019/045038
§ 371 (c)(1),
(2) Date: Mar. 17, 2022

(87) PCT Pub. No.: WO2021/100076
PCT Pub. Date: May 27, 2021

(65) Prior Publication Data
US 2022/0363310 A1 Nov. 17, 2022

(51) Int. Cl.
*B62D 5/04* (2006.01)
*G01B 7/30* (2006.01)
*G01D 5/20* (2006.01)

(52) U.S. Cl.
CPC ............. *B62D 5/0463* (2013.01); *G01B 7/30* (2013.01); *G01D 5/20* (2013.01)

(58) Field of Classification Search
CPC ........... B62D 5/0463; G01B 7/30; G01D 5/20
See application file for complete search history.

(56) References Cited

U.S. PATENT DOCUMENTS 12,163,809 B2 * 12/2024 Ikeda ...................... H02K 3/28
2013/0060518 A1 3/2013 Nakazato
(Continued)

FOREIGN PATENT DOCUMENTS

EP    3 324 523 A1    5/2018
JP    4157930 B2    10/2008
(Continued)

OTHER PUBLICATIONS

Extended European Search Report dated Oct. 5, 2022 in European Application No. 19952986.8.
(Continued)

*Primary Examiner* — Reena Aurora
(74) *Attorney, Agent, or Firm* — Sughrue Mion, PLLC

(57) ABSTRACT

The redundant resolver includes: a resolver body having a rotor, a stator opposed to the rotor and having Ns teeth arranged in a circumferential direction, and an excitation winding and two phases of output windings wound on the stator; an excitation circuit configured to supply power to the excitation winding; and an angle calculation unit configured to calculate a rotation angle on the basis of signals from the two phases of output windings. The stator is divided in the circumferential direction into M pieces which serve as M tooth blocks, N (M≥N) redundancy systems are formed on the basis of the M tooth blocks. The excitation circuit and the angle calculation unit are provided to each system so as be independent among the systems. Gap magnetic flux densities at both end portions of each tooth block are set to change mildly.

18 Claims, 15 Drawing Sheets

(56) References Cited

U.S. PATENT DOCUMENTS

2017/0349211 A1* 12/2017 Shiino .................... G01B 7/30
2019/0044419 A1*  2/2019 Matsunawa .......... H02K 11/225
2020/0363233 A1   11/2020 Ikeda et al.

FOREIGN PATENT DOCUMENTS

| JP | 2009-98028 A   | 5/2009  |
| JP | 2009-222435 A  | 10/2009 |
| JP | 2009-300238 A  | 12/2009 |
| JP | 2013-053890 A  | 3/2013  |
| JP | 2018-185221 A  | 11/2018 |
| WO | 2019/123592 A1 | 6/2019  |

OTHER PUBLICATIONS

International Search Report for PCT/JP2019/045038 dated Jan. 7, 2020 [PCT/ISA/210].
Written Opinion for PCT/JP2019/045038 dated Jan. 7, 2020 [PCT/ISA/237].
Office Action issued Jun. 21, 2024 in Chinese Application No. 201980102204.7.
Notification of Reasons for Refusal dated Mar. 28, 2023 from the Japanese Patent Office in application No. 2021-558039.

* cited by examiner

A (NUMBER OF TURNS OF EXCITATION WINDING ON EACH OF TEETH LOCATED AT BOTH ENDS OF FIRST-SYSTEM TOOTH BLOCK/NUMBER OF TURNS OF EXCITATION WINDING ON EACH OF TEETH NOT LOCATED AT SAID BOTH ENDS)

FIG. 13
|  | EXAMPLE 1 | EXAMPLE 2 | COMPARATIVE EXAMPLE 1 | COMPARATIVE EXAMPLE 2 |
|---|---|---|---|---|
| TWO EXCITATION CIRCUITS | INDEPENDENT | | | INDEPENDENT * AT TIME OF PHASE DIFFERENCE 0° |
| RATIO OF NUMBER OF TURNS ON EACH OF TEETH AT BOTH END PORTIONS (A) | 2/3 | 1 | 1 | 1 |
| FREQUENCIES OF RESPECTIVE EXCITATION SIGNALS (f1, f2) | f1=10kHz f2=20kHz | | f1=10kHz f1=10kHz | |
| RATIO OF WIDTH OF EACH OF TEETH AT BOTH END PORTIONS (B) | 1 | 5/6 | 1 | 1 |
FIG. 14
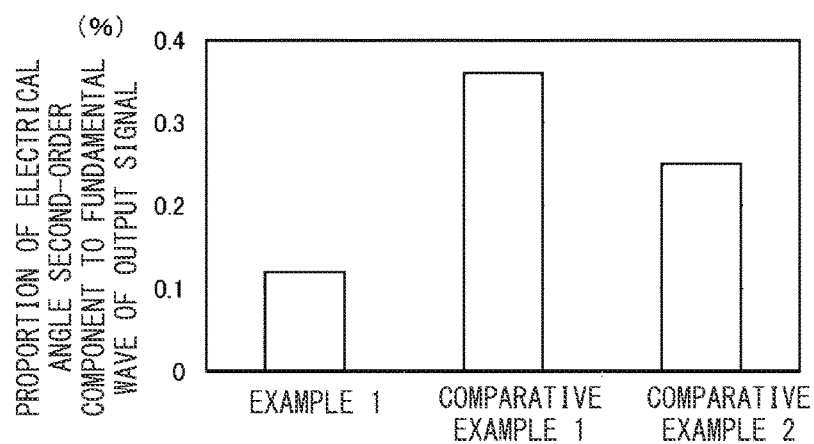
FIG. 15
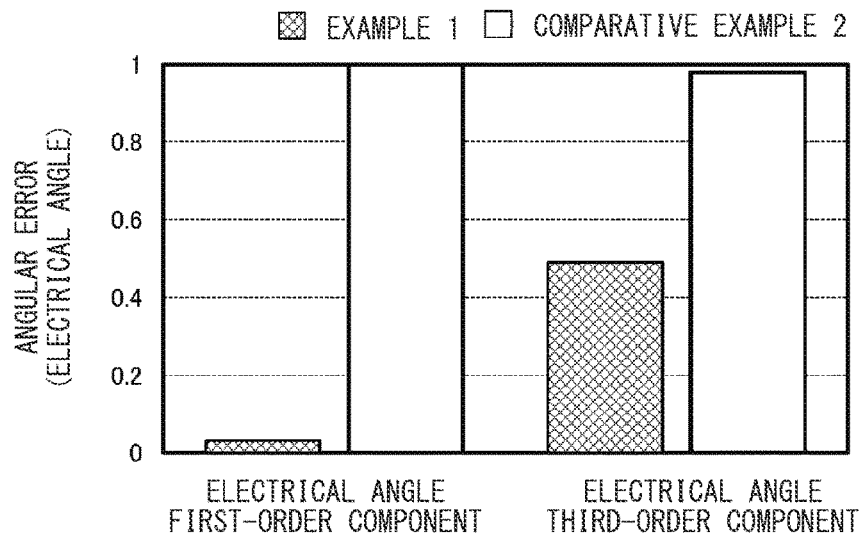

REDUNDANT RESOLVER AND ELECTRIC POWER STEERING DEVICE MOUNTED THEREWITH

CROSS REFERENCE TO RELATED APPLICATIONS

This application is a National Stage of International Application No. PCT/JP2019/045038 filed Nov. 18, 2019.

TECHNICAL FIELD

The present disclosure relates to a redundant resolver and an electric power steering device mounted therewith.

BACKGROUND ART

Among resolvers that make use of change in permeance at a gap between a rotor and a stator, multiplex resolvers (so-called redundant resolvers) having two sets of excitation windings connected to different excitation circuits have been known.

For example, Patent Document 1 discloses a redundant resolver having two excitation windings, the redundant resolver achieving redundancy by dividing, in a circumferential direction, one resolver stator into a first system and a second system in order to reduce a dimension in an axial direction.

CITATION LIST

Patent Document

Patent Document 1: Japanese Patent No. 4157930
Patent Document 2: Japanese Laid-Open Patent Publication No. 2009-222435

SUMMARY OF THE INVENTION

Problems to be Solved by the Invention

However, in Patent Document 1, teeth on which the excitation windings of the different systems are wound are adjacent to each other, and thus a problem arises in that magnetic interference occurs between the different systems, whereby the accuracy of angle detection deteriorates.

In order to inhibit such deterioration of the accuracy of angle detection due to magnetic interference in a redundant resolver, a configuration has been disclosed in which two resolvers each having two excitation windings connected to different excitation circuits are stacked on each other in an axial direction, only a first output winding is wound on one of the resolvers, and only a second output winding is wound on the other resolver (for example, Patent Document 2).

However, in Patent Document 2, the two resolvers are stacked on each other via a shaft, and thus a problem arises in that the dimension in the axial direction is twice as large as that of a single-system resolver.

The present disclosure has been made to solve the above problems, and an object of the present disclosure is to provide a redundant resolver having a high accuracy of angle detection without having an increased size.

Solution to the Problems

A redundant resolver according to the present disclosure includes: a resolver body having a rotor having Nx (Nx represents a natural number) salient poles, a stator opposed to the rotor and having Ns (Ns represents an integer of 2 or more) teeth arranged in a circumferential direction, and an excitation winding and two phases of output windings, the excitation winding and the output windings being wound on each tooth; an excitation circuit configured to supply power to the excitation winding; and an angle calculation unit configured to calculate a rotation angle of a rotary body provided with the rotor, on the basis of signals from the two phases of output windings. The stator is divided in the circumferential direction into M pieces which serve as M tooth blocks, N (N represents an integer of 2 or more and satisfies M≥N) redundancy systems are formed on the basis of the M tooth blocks, and a sum of division angles in each system is 360/N degrees. The excitation circuit is provided to each system so as be independent among the systems, and the angle calculation unit is also provided to each system so as be independent among the systems. Gap magnetic flux densities at both end portions of each tooth block are set to change mildly.

Effect of the Invention

In the redundant resolver according to the present disclosure, the gap magnetic flux densities at both end portions of each tooth block are set to change mildly, and thus an electrical angle second-order component to be superimposed on an output signal can be reduced, whereby the accuracy of angle detection can be improved.

BRIEF DESCRIPTION OF THE DRAWINGS

FIG. 13 illustrates conditions for examples and comparative examples.

FIG. 14 illustrates an effect of reducing the electrical angle second-order component to be superimposed on the output signal in the redundant resolver according to embodiment 1.

FIG. 15 illustrates an effect of reducing an angular error in the redundant resolver according to embodiment 1.

DESCRIPTION OF EMBODIMENTS

Figure 1:
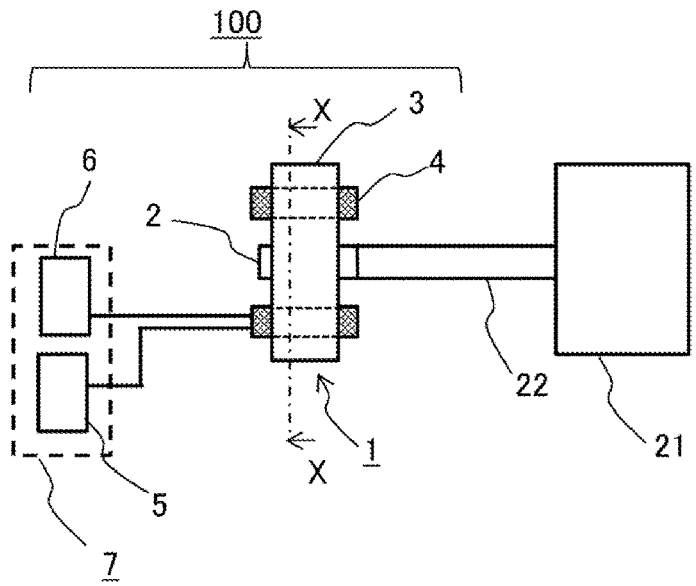
FIG. 1 illustrates an example in which a redundant resolver according to embodiment 1 is mounted to a rotary electric machine.

Hereinafter, the present embodiments will be described with reference to the drawings. In the drawings, the same or corresponding parts are denoted by the same reference characters.

Embodiment 1

Hereinafter, a redundant resolver according to embodiment 1 will be described.

FIG. 1 illustrates an example in which the redundant resolver according to the present embodiment 1 is mounted to a rotary electric machine. It is noted that, although an example in which the redundant resolver is mounted on a shaft of the rotary electric machine is shown, the mounting target is not limited to the rotary electric machine as long as the mounting target is a rotary shaft of a rotary portion (rotary body) in any of various devices. In FIG. 1, a redundant resolver 100 is mounted on a shaft 22 which is a rotary shaft of a rotary electric machine 21. The redundant resolver 100 is provided with: a resolver body 1 which is a sensor; and a control circuit 7 which controls the resolver body 1. The resolver body 1 includes a pair that is composed of a stator 3 and a rotor 2, and windings 4 are wound on the stator 3. The rotor 2 is connected to the rotary portion of the rotary electric machine 21 via the shaft 22. The control circuit 7 includes: an excitation circuit 6 which applies AC voltage to excitation windings (described later) among the windings 4, to excite the excitation windings; and an angle calculation unit 5 which calculates a rotation angle from the waveforms of signals from output windings (described later) among the windings 4.

Figure 2:
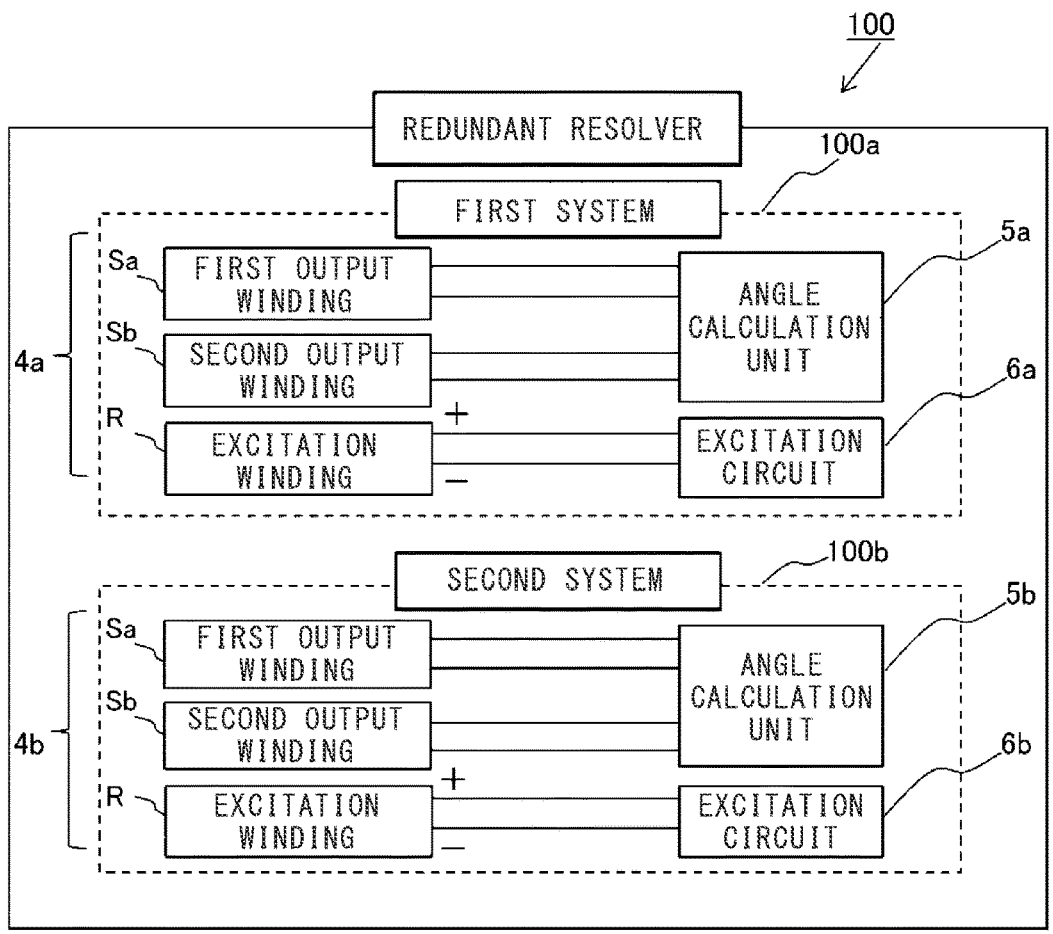
FIG. 2 illustrates a configuration of the redundant resolver according to embodiment 1.

FIG. 2 illustrates a configuration of the redundant resolver according to the present embodiment 1. In FIG. 2, the redundant resolver 100 includes a first-system resolver 100a and a second-system resolver 100b. That is, an example of a duplex system is shown here. Each of the first-system resolver 100a and the second-system resolver 100b includes, as windings 4a or 4b, first output windings Sa, second output windings Sb, and excitation windings R. The first output windings Sa and the second output windings Sb are connected to an angle calculation unit 5a or 5b. The excitation windings R are connected to an excitation circuit 6a or 6b. In this manner, the angle calculation units 5a and 5b are provided to the respective systems and independent of each other, and the excitation circuits 6a and 6b are also provided to the respective systems and independent of each other, whereby redundancy is ensured.

Figure 3:
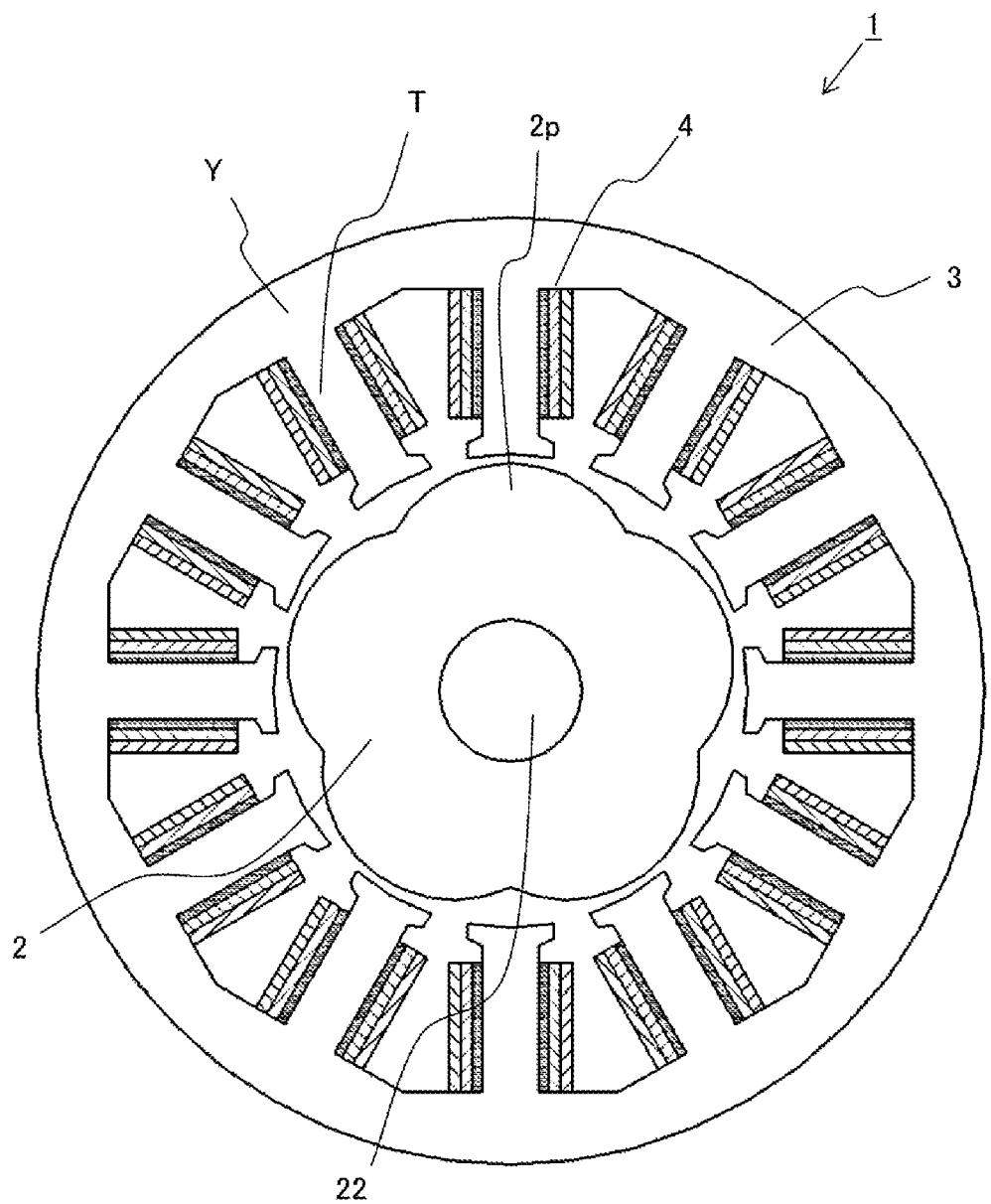
FIG. 3 is a cross-sectional view of a resolver body of the redundant resolver according to embodiment 1.

FIG. 3 is a cross-sectional view of the resolver body 1 at the line X-X in FIG. 1. In FIG. 3, the windings 4 are wound on respective teeth T in the stator 3 having a yoke Y and the teeth T. The rotor 2 having salient pole portions 2p is mounted on the shaft 22. In the present embodiment 1, the number Ns of the teeth T in the stator 3 of the redundant resolver is 12, and the number Nx of the salient poles in the rotor of the redundant resolver is 5. The number of salient poles is also called a shaft angle multiplier.

Figure 4:
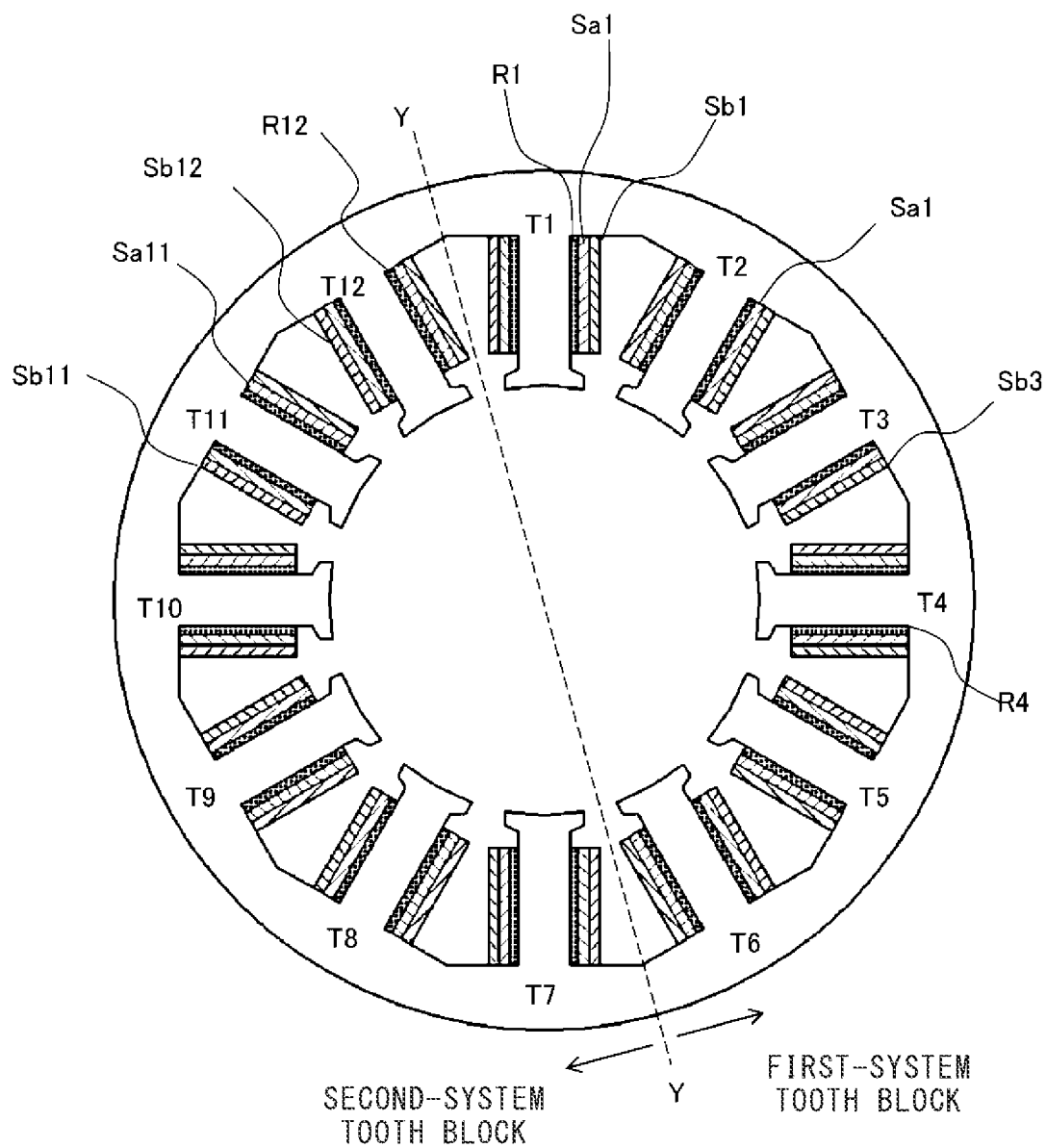
FIG. 4 is a cross-sectional view of a stator of the redundant resolver according to embodiment 1.

FIG. 4 is a diagram in which the rotor 2 and the shaft 22 have been excluded from FIG. 3. FIG. 4 corresponds to a cross-sectional view of the stator 3. FIG. 4 illustrates a configuration of a part of each of the first system resolver 100a and the second-system resolver 100b. As described above, the number Ns of the teeth T in the stator 3 of the redundant resolver is 12. If the teeth T are named a tooth T1 to a tooth T12 in the clockwise direction, the teeth T are divided, as by the line Y-Y in FIG. 4. Specifically, the teeth T are divided in a circumferential direction into two blocks which are: a block of first-system teeth which are the tooth T1 to the tooth T6; and a block of second-system teeth which are the tooth T7 to the tooth T12. The block of the first-system teeth composes the first-system resolver 100a, the block of the second-system teeth composes the second-system resolver 100b, and both blocks compose the duplex redundant resolver.

Next, the windings 4 on the teeth T will be described.

A winding group composed of one phase of excitation winding R and two phases of output windings Sa and Sb is wound on each tooth T. That is, first-system excitation windings R1 to R6, first-system first output windings Sa1 to Sa6, and first-system second output windings Sb1 to Sb6 are wound on the first-system teeth T1 to T6. Likewise, second-system excitation windings R7 to R12, second-system first output windings Sa7 to Sa12, and second-system second output windings Sb7 to Sb12 are wound on the second-system teeth T7 to T12.

Each of the first-system excitation windings R1 to R6 and each of the second-system excitation windings R7 to R12 are connected to the first-system excitation circuit 6a and the second-system excitation circuit 6b via excitation terminals (not shown) provided to extending portions (not shown) of the resolver.

Each of the first-system first output windings Sa1 to Sa6 and each of the first-system second output windings Sb1 to Sb6 are connected to the first-system angle calculation unit 5a via output terminals (not shown) provided to extending portions of the resolver. Each of the second-system first output windings Sa7 to Sa12 and each of the second-system second output windings Sb7 to Sb12 are connected to the second-system angle calculation unit 5b via output terminals (not shown) provided to extending portions of the resolver. The first-system angle calculation unit 5a and the second-system angle calculation unit 5b respectively calculate a first-system detection angle θ1 and a second-system detection angle θ2 of the rotor 2 according to output signals outputted from the first and second output windings, i.e., the two phases of output windings, and output the angles θ1 and θ2 (see FIG. 2).

With a focus placed on the tooth T1, the excitation winding R1 is wound thereon first, and then the first output winding Sa1 and the second output winding Sb1 are wound thereon in this order. That is, a configuration is employed in which the excitation winding is wound first, and the two phases of output windings are wound thereon. The order of winding the two phases of output windings, i.e., the first output winding Sa1 and the second output winding Sb1, is not limited to this order, and either of them may be wound first. Further, there is a case where a tooth on which one phase of output winding out of the two phases of output windings is not wound is provided. A stator core including each tooth and a corresponding winding are insulated from each other by means of insulation paper, coating, resin, or the like (not shown). It is noted that, although the tooth T1 has been described, the other teeth T2 to T12 also have the respective windings wound thereon in the same manner.

The first-system excitation windings R1 to R6 are connected in series, the first-system first output windings Sa1 to Sa6 are connected in series, and the first-system second output windings Sb1 to Sb6 are connected in series. Likewise, the second-system excitation windings R7 to R12 are connected in series, the second-system first output windings Sa1 to Sa12 are connected in series, and the second-system second output windings Sb7 to Sb12 are connected in series.

It is noted that, although the windings have been described here as being connected in series in the order of the teeth T1 to T6 and the teeth T7 to T12, the same advantageous effects are obtained also by making series connection in order from, as the teeth at the winding start, any teeth Ti that are adjacent to each other in the respective systems.

Further, although one phase of excitation winding and two phases of output windings have been described as being wound such that the windings are arranged in the circumferential direction, the present disclosure is not limited thereto, and the same advantageous effects can be obtained also by: arranging the windings in a radial direction; changing the winding order among the teeth; or the like.

Figure 5A:
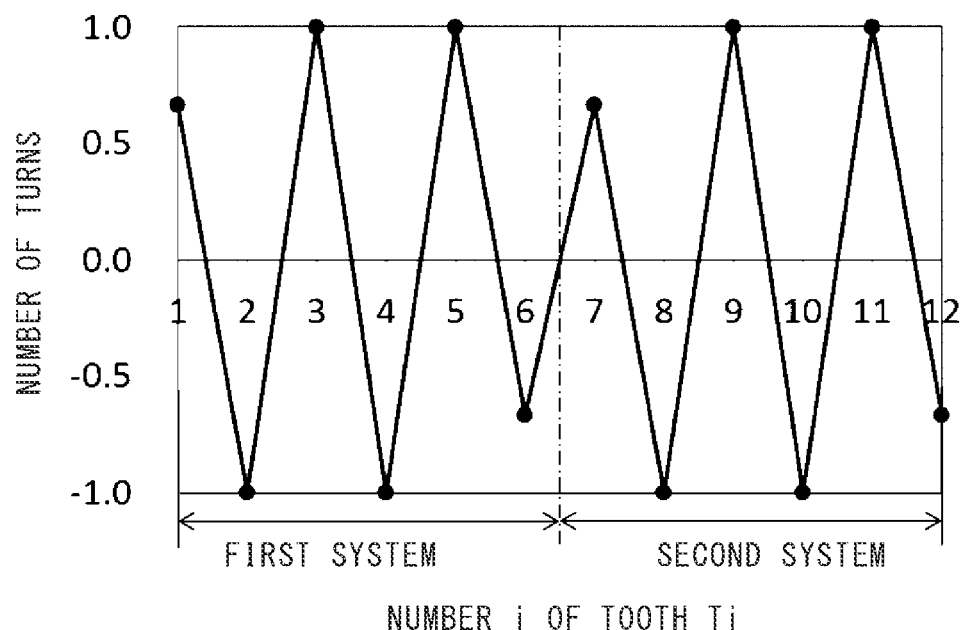
FIG. 5A illustrates the numbers of turns of excitation windings in the redundant resolver according to embodiment 1.
Figure 5B:
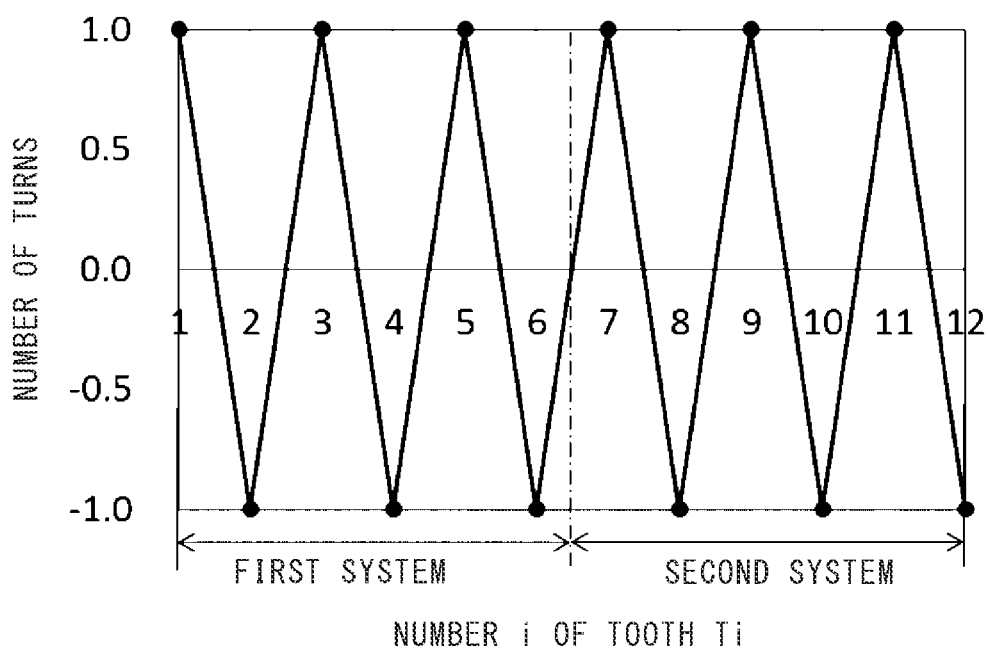
FIG. 5B illustrates the numbers of turns of excitation windings in a redundant resolver that is a comparative example.

Next, the numbers of turns of the first-system excitation windings and the second-system excitation windings in the redundant resolver according to the present embodiment 1 will be described. FIG. 5A illustrates a distribution of the windings in the redundant resolver according to the present embodiment 1, and FIG. 5B illustrates a distribution of windings in a comparative example. In each of FIG. 5A and FIG. 5B, the number of turns for excitation is normalized with amplitude, and the numbers of turns of the excitation windings wound on the first-system teeth and the second-system teeth are continuously shown. For excitation windings in resolvers, a winding direction (+) and a winding direction (−) are defined. In the redundant resolver according to the present embodiment 1, winding directions (+) and winding directions (−) of the excitation windings are alternately present. "(+)" and "(−)" represent the polarities, of the windings, that are different from each other. If the direction of a winding of a certain coil is expressed with the winding direction (+), a coil having a winding wound in the opposite direction (+) is expressed with the winding direction (−). The number of turns in the winding direction (+) and the number of turns in the winding direction (−) take the same absolute value. Therefore, the spatial order Ne of the excitation windings is 6. That is, if the number of turns in the winding direction (+) is defined as +X times, the number of turns in the winding direction (−) is −X times. It is noted that, although the windings are wound in the winding directions (+) and the winding directions (−) alternately and the spatial order of the excitation windings is 6 here, the winding arrangement is not limited thereto, and it is possible to employ other winding arrangements such as a winding arrangement in which: the winding directions (+) and the winding directions (−) are present at every two teeth; and the spatial order of the excitation windings is 3.

It is noted that, in the comparative example in FIG. 5B, the numbers of turns are the same among all the teeth T1 to T12 in the first-system tooth block and the second-system tooth block. Meanwhile, in the redundant resolver according to the present embodiment 1 shown in FIG. 5A, the number of turns of the excitation winding wound on each of the teeth T1 and T6 located at both ends of the first-system tooth block and the teeth T7 and T12 located at both ends of the second-system tooth block, is smaller than the number of turns of the excitation winding wound on each of the other teeth, i.e., the teeth T2, T3, T4, and T5 and the teeth T8, T9, T10, and T11 not located at said both ends. A desirable number of turns in the present embodiment 1 will be described later.

As described above, in the redundant resolver according to the present embodiment 1, the first-system excitation circuit 6a which gives an excitation signal to the first-system excitation windings R1 to R6 and the second-system excitation circuit 6b which gives an excitation signal to the second-system excitation windings R7 to R12 are independent of each other, whereby redundancy is ensured. However, since the excitation circuits are independent of each other, it is difficult to synchronize a first-system excitation signal and a second-system excitation signal. There is variation in manufacturing between, for example, microcomputers that implement the first-system excitation circuit 6a and the second-system excitation circuit 6b. Thus, even if designing is performed such that the frequencies of the first-system excitation signal and the second-system excitation signal are the same as each other, these excitation signals do not completely match, and a slight difference is generated therebetween. Thus, the difference between the first-system excitation signal and the second-system excitation signal is not fixed but changes over time. Consequently, the excitation signal of either system influences the other system.

Figure 6:
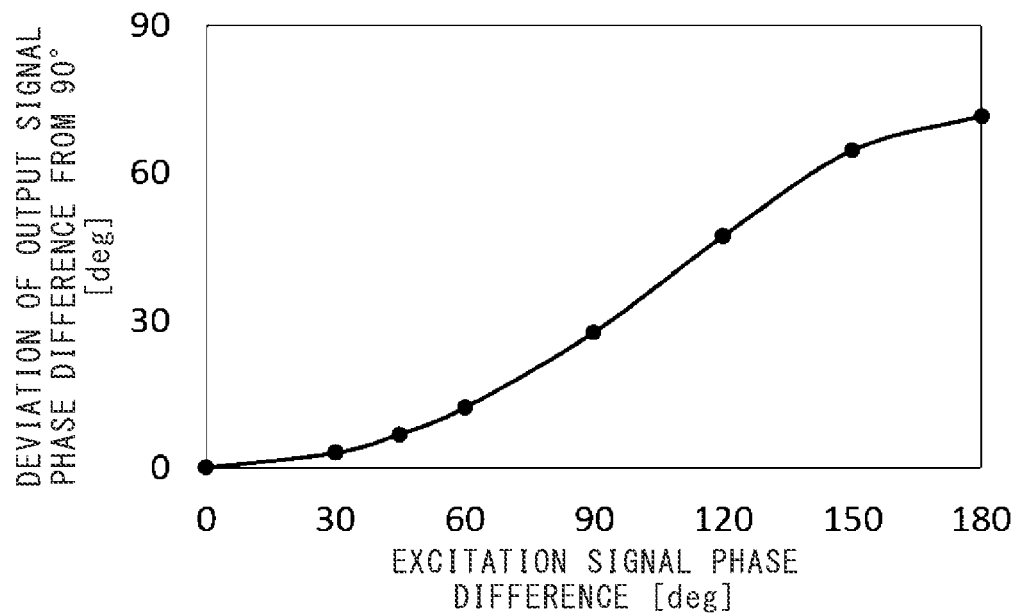
FIG. 6 illustrates the relationship of the phase difference between a first output signal and a second output signal with respect to the phase difference between a first-system excitation signal and a second-system excitation signal in the redundant resolver.

FIG. 6 is a diagram for the case where the first-system excitation circuit 6a and the second-system excitation circuit 6b are independent of each other in a resolver in which the numbers of turns are set in the same manner as in the comparative example in FIG. 5B. In FIG. 6, the horizontal axis represents the phase difference between the first-system excitation signal and the second-system excitation signal, and the vertical axis represents the amount of deviation, from 90°, of the phase difference between a first-system first output signal and a first-system second output signal. When the phase difference between the first-system first output signal and the first-system second output signal is 90°, i.e., when both the horizontal axis and the vertical axis take the value of 0, angle detection can be performed with the highest accuracy. It is seen that, as the phase difference between the first-system excitation signal and the second-system excitation signal becomes larger, the phase difference between the first-system first output signal and the first-system second output signal deviates more from 90°. It is noted that, although FIG. 6 shows the phase difference between the first-system output signals, a similar phenomenon occurs for the phase difference between second-system output signals.

Figure 7:
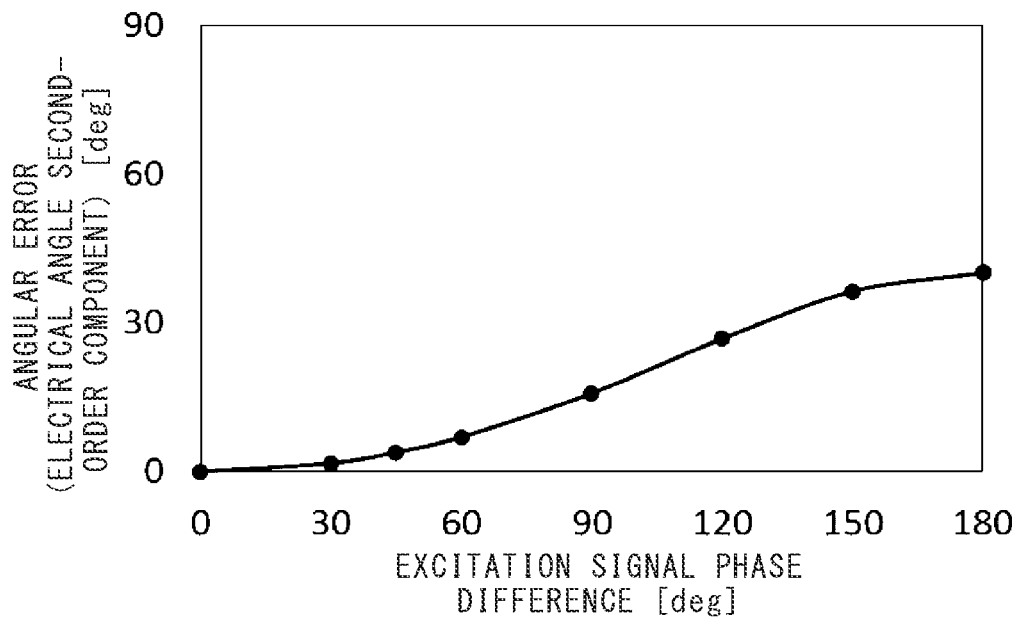
FIG. 7 illustrates the relationship of an angular error (electrical angle second-order component) with respect to the phase difference between the first-system excitation signal and the second-system excitation signal in the redundant resolver.

FIG. 7 is a diagram under the same condition as the above condition, i.e., a diagram for the case where the first-system excitation circuit 6a and the second-system excitation circuit 6b are independent of each other in the resolver in which the numbers of turns are set in the same manner as in the comparative example in FIG. 5B. In FIG. 7, in the same manner as in FIG. 6, the horizontal axis represents the phase difference between the first-system excitation signal and the second-system excitation signal, and the vertical axis represents an electrical angle second-order component of an angular error which is the difference between the true value of a magnetic pole angle in the rotary electric machine and an angle detected by the redundant resolver. It is seen that, as the phase difference between the first-system excitation signal and the second-system excitation signal becomes larger, the electrical angle second-order component of the angular error becomes larger. When a phase difference is generated between the first-system excitation signal and the second-system excitation signal, the phase difference between the first output signal and the second output signal deviates from 90°. As a result, the electrical angle second-order component of the angular error increases. The angular error causes torque ripple. Thus, in order to obtain a high-performance rotary electric machine that is prone to little torque ripple, the angular error of the resolver needs to be reduced. However, a redundant resolver in which the first-system excitation circuit and the second-system excitation circuit are independent of each other and synchronization therebetween cannot be achieved, has the problem that the accuracy of angle detection deteriorates during use. It is noted that, in FIG. 7, the same behavior is observed for the electrical angle second-order component of the angular error detected in either the first system or the second system.

In this manner, since the first-system excitation circuit 6a and the second-system excitation circuit 6b are independent of each other, the redundant resolver according to the present embodiment is found to have mutually exclusive effects, i.e., ensuring of redundancy and possibility of deterioration in angle detection error.

Figure 8:
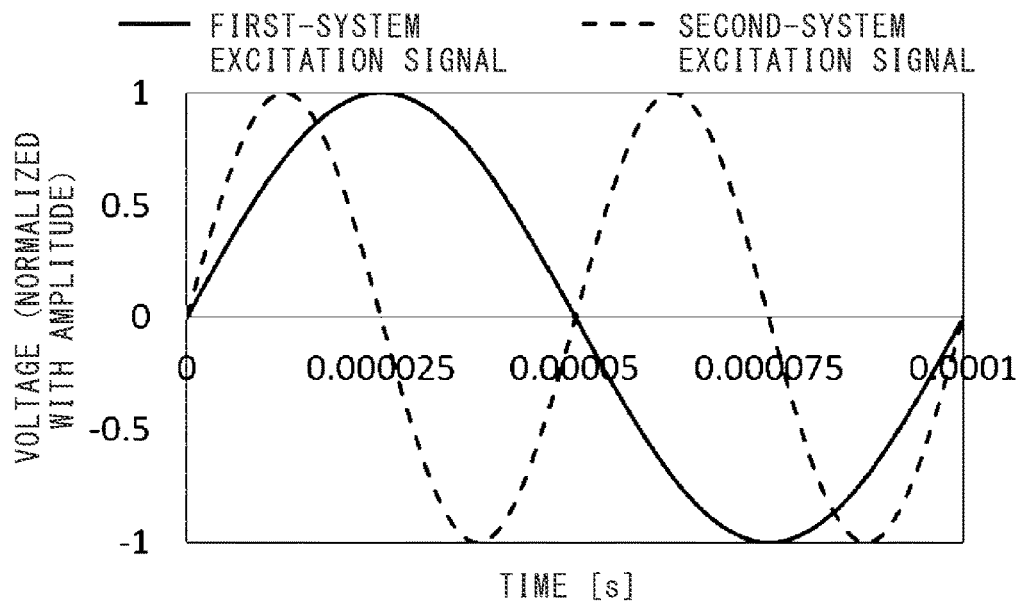
FIG. 8 illustrates the waveforms of the first-system excitation signal and the second-system excitation signal in the redundant resolver according to embodiment 1.

In addition, since the first-system excitation circuit and the second-system excitation circuit are independent of each other, the redundant resolver according to the present embodiment 1 can supply excitation signals having different frequencies from the respective excitation circuits to corresponding excitation windings. FIG. 8 shows the first-system excitation signal and the second-system excitation signal in the redundant resolver according to the present embodiment 1. FIG. 8 shows an example in which the first-system excitation signal has a frequency f1 of 10 kHz, and the second-system excitation signal has a frequency f2 of 20 kHz. It is noted that the vertical axis is normalized with the amplitude of excitation signal voltage.

Further, each of the angle calculation units 5a, 5b has a function of eliminating a frequency component of the other system. That is, from the first-system first output signal and the first-system second output signal, a component based on the second-system excitation signal is eliminated and only a component based on the first-system excitation signal is extracted. Likewise, from a second-system first output signal and a second-system second output signal, a component based on the first-system excitation signal is eliminated and only a component based on the second-system excitation signal is extracted. Hereinafter, a method for eliminating a frequency component of the other system will be described.

Figure 9:
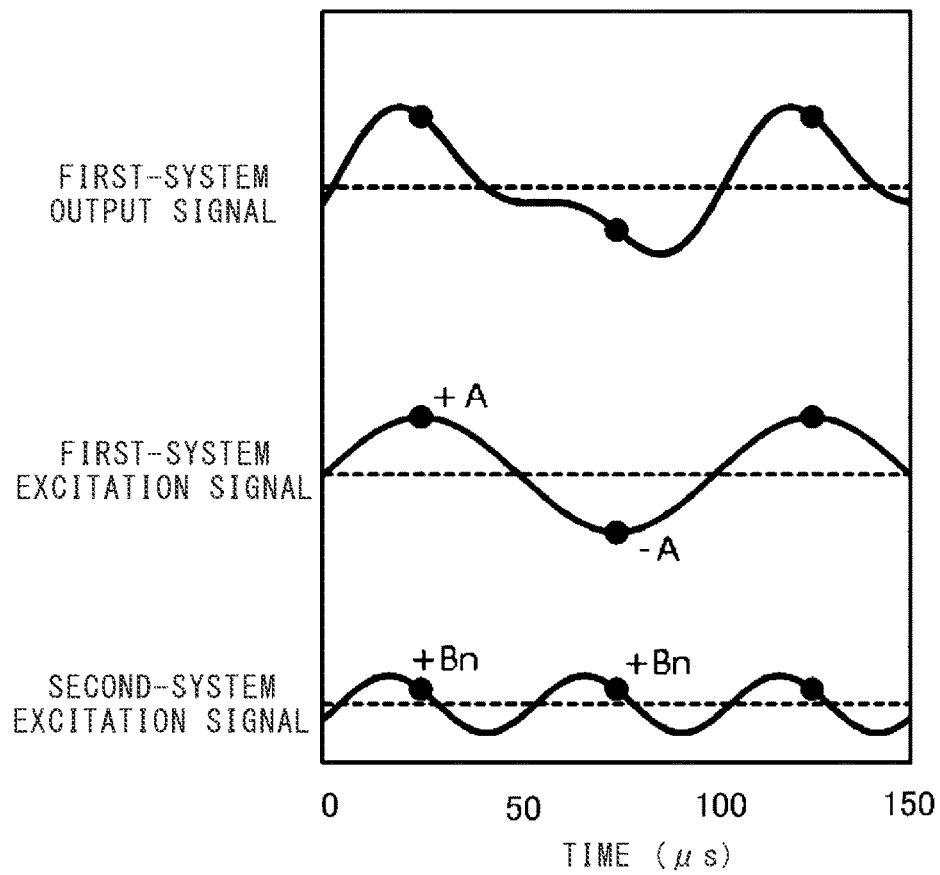
FIG. 9 is a diagram for explaining the waveform of a first-system output signal.

FIG. 9 is a diagram for explaining the waveform of a first-system output signal and shows, in order from the upper side, the waveforms of the first-system output signal, a first-system excitation signal, and a second-system excitation signal. Although the first-system output signal originally has the waveform with the frequency f1 corresponding to the first-system excitation signal, the first-system output signal has a waveform in which a component having the frequency f2 of the second-system excitation signal has been added. As shown in FIG. 9, it is seen that, although +A and −A of the first-system excitation signal respectively correspond to a positive peak and a negative peak of the signal, +Bn and +Bn of a component of the second-system excitation signal are respectively added thereto so that the first-system output signal has a waveform obtained by distorting a sine wave. Therefore, if this first-system output signal is sampled at a cycle of 1/f1 and an arc tangent is directly calculated, an error occurs owing to the component having the frequency f2 of the second-system excitation signal. Considering this, the first-system output signal is sampled at 2/f1, to obtain $\{(A+Bn)-(-A+Bn)\}1/2$. Consequently, only a component A having the frequency f1 of the first-system excitation signal can be extracted, and a component Bn having the frequency f2 of the second-system excitation signal can be eliminated. Thus, the accuracy of rotation angle detection can be improved.

Figure 10:
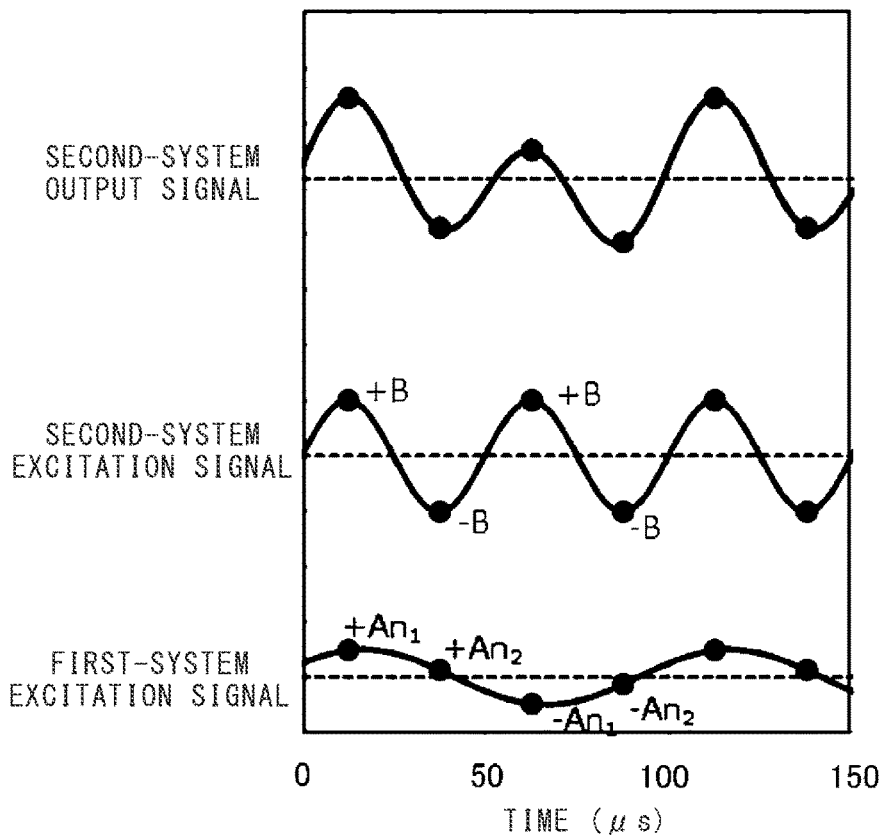
FIG. 10 is a diagram for explaining the waveform of a second-system output signal.

FIG. 10 is a diagram for explaining the waveform of a second-system output signal and shows, in order from the upper side, the waveforms of the second-system output signal, a second-system excitation signal, and a first-system excitation signal. Although the second-system output signal originally has the waveform with the frequency f2 corresponding to the second-system excitation signal, the second-system output signal has a waveform in which a component having the frequency f1 of the first-system excitation signal has been added. As shown in FIG. 10, it is seen that, although +B, −B, +B, and −B of the second-system excitation signal correspond to positive peaks and negative peaks of the signal, +An1, +An2, −An1, and −An2 of a component of the first-system excitation signal are respectively added thereto so that the second-system output signal has a waveform obtained by distorting a sine wave. Therefore, if this second-system output signal is sampled at a cycle of 1/f2 and an arc tangent is directly calculated, an error occurs owing to the component having the frequency f1 of the first-system excitation signal. Considering this, the second-system output signal is sampled at 2/f2, to obtain $\{(B+An1)+(B-An1)-(-B+An2)-(-B-An2)\}/4$. Consequently, only a component B having the frequency f2 of the second-system excitation signal can be extracted, and a component An having the frequency f1 of the first-system excitation signal can be eliminated. Thus, the accuracy of rotation angle detection can be improved.

As shown in FIG. 3 and FIG. 4, the redundant resolver according to the present embodiment 1 has a different system for every half circle of the stator. Further, excitation signals having frequencies that differ between the systems are supplied, and each angle calculation unit eliminates influence of the excitation signal of the other system. Therefore, the first system and the second system are in a state of being independent of each other. That is, with a focus placed on the first system, the second-system excitation signal is not applied to the first-system excitation windings wound on the first-system teeth. Thus, the first system is in the same physical state as that in the case where the second system suffers a failure such as disconnection. Meanwhile, with a focus placed on the second system, the second system is in the same physical state as that in the case where the first system suffers a failure such as disconnection. This indicates the following superiority. That is, excitation signals having frequencies different from each other are supplied from the independent excitation circuits so that, in each system, a signal that does not influence the signal of the other system is obtained.

Advantageous effects in the present embodiment 1 will be described in contradistinction to a comparative example in consideration of the above problems and characteristics due to the feature in which the first-system excitation circuit 6a and the second-system excitation circuit 6b are independent of each other in the redundant resolver according to the present embodiment 1.

Figure 11:
FIG. 11 illustrates changes in an electrical angle second-order component superimposed on an output signal with respect to the number of turns of the excitation winding on each of teeth located at both ends of a first-system tooth block, in the redundant resolver according to embodiment 1.

FIG. 11 illustrates the relationship between: the number of turns at each of both ends of the first-system tooth block in FIG. 5A; and the proportion of an electrical angle second-order component to a fundamental wave of a first output signal. The horizontal axis represents the ratio of the number of turns of the excitation winding wound on each of the teeth (teeth T1 and T6) located at both ends of the first-system tooth block to the number of turns of the excitation winding wound on each of the teeth (teeth T2, T3, T4, and T5) not located at both ends of the first-system tooth block. This ratio is defined as A. The vertical axis represents the proportion of the electrical angle second-order component to the fundamental wave of the first-system first output signal. In the horizontal axis, A=1 means that all the teeth (teeth T1 to T6) in the first-system tooth block have the same number of turns (corresponding to the comparative example in FIG. 5B). The vertical axis is normalized with the value obtained at the time of A=1.

With a focus placed on A=1 in the horizontal axis, as the number of turns on each of the teeth (teeth T1 and T6) located at both ends of the first-system tooth block is made smaller, i.e., as the A is made lower, the proportion of the electrical angle second-order component to the fundamental wave of the first output signal becomes lower. If the proportion of the superimposed electrical angle second-order component is reduced, the angle detection error is reduced. However, if the number of turns is significantly reduced such that the A becomes lower than 2/7, the proportion of the superimposed electrical angle second-order component becomes higher than that at the time of A=1 at which the number of turns is the same among all the teeth in the first-system tooth block. That is, at the time of 2/7<A<1, the electrical angle second-order component to be superimposed on the output signal can be made smaller than that obtained when the numbers of turns are set in the same manner as in the comparative example. Further, judging from FIG. 11, the electrical angle second-order component to be superimposed on the output signal can be made minimum (about ⅓ of that at the time of A=1) at the time of A=2/3.

Next, advantageous effects of reducing the number of turns of the excitation winding on each of the teeth located at both end portions of the tooth block in each system, will be described with reference to FIG. 12.

Figure 12:
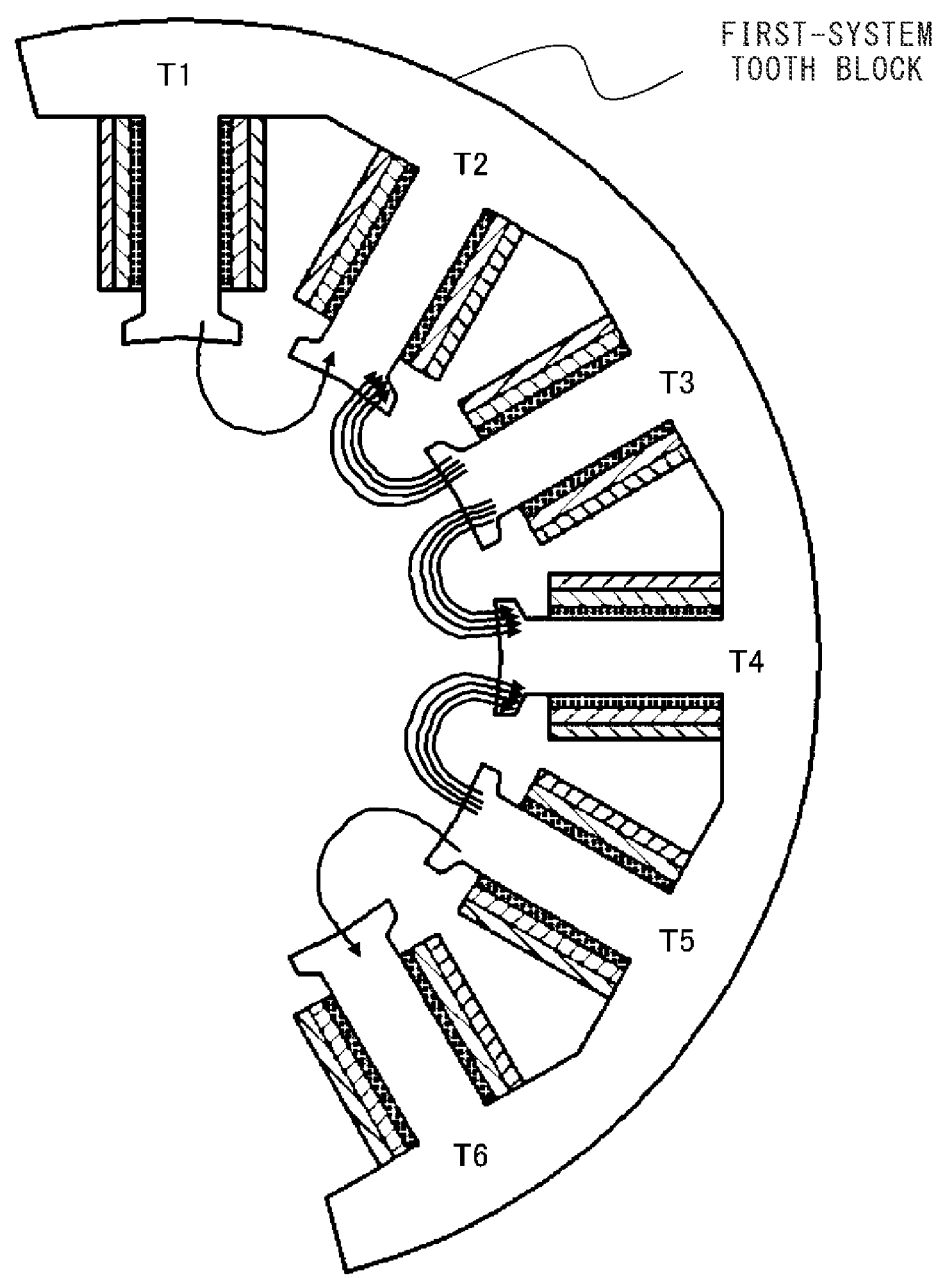
FIG. 12 illustrates the orientations of magnetic fluxes that interlink with the teeth of the redundant resolver according to embodiment 1.

FIG. 12 illustrates the orientations of magnetic fluxes that interlink with the teeth of the first-system tooth block in the present embodiment 1. In FIG. 12, each of the teeth T2, T3, T4, and T5 of the first-system tooth block are influenced by adjacent teeth on both sides of the tooth, as is known from the arrows. Meanwhile, each of the teeth T1 and T6 located at both ends of the first-system tooth block is influenced by magnetic flux of only one of adjacent teeth on both sides of the tooth. That is, the teeth T1 and T6 are respectively influenced by magnetic fluxes of only the teeth T2 and T5 that are adjacent thereto and that belong to the first-system tooth block. As described above, in the redundant resolver according to the present embodiment 1, the number of turns of the excitation winding wound on each of the teeth located at both ends of the first-system tooth block is smaller than the number of turns of the excitation winding wound on each of the other teeth of the first-system tooth block. Consequently, magnetomotive forces at the teeth T1 and T6 located at both end portions of the first-system tooth block are weakened, and gap magnetic flux densities at both end portions of the first-system tooth block change more mildly than in the comparative example in which the teeth T1 to T6 located at both ends also have the same number of turns. Therefore, the electrical angle second-order component to be superimposed on the output signal is reduced. Although not shown, the same applies to the second-system tooth block as well. Specifically, magnetomotive forces at the teeth T7 and T12 located at both end portions of the second-system tooth block are weakened, and gap magnetic flux densities at both end portions of the second-system tooth block change more mildly than in the comparative example in which the teeth T7 and T12 located at both ends also have the same number of turns. Therefore, the electrical angle second-order component to be superimposed on the output signal is reduced.

As shown in FIG. 11, if the ratio of the number of turns on each of the teeth located at both end portions is reduced, the electrical angle second-order component to be superimposed on the output signal is reduced as described above owing to weakening of the magnetomotive forces at the teeth located at both end portions. However, if the A becomes lower than 2/7, the teeth at both end portions do not sufficiently function as the stator, and the effect of moderating the changes in the gap magnetic flux densities at both end portions is reduced. Consequently, the electrical angle second-order component increases again.

Next, an example of the effect in the present embodiment 1 is described.

FIG. 14 illustrates an example of the effect of the redundant resolver according to the present embodiment 1 and is a diagram in which example 1 and comparative examples 1 and 2 are compared to one another in terms of the proportion of an electrical angle second-order component to a fundamental wave of an output signal under conditions shown in FIG. 13. Firstly, the conditions will be described. As shown in FIG. 13, a redundant resolver in example 1 has first-system and second-system tooth blocks that respectively serve as the first-system resolver 100a and the second-system resolver 100b. The excitation circuits 6a and 6b of the respective resolvers are independent of each other, the frequency f1 of a first-system excitation signal is 10 kHz, and the frequency f2 of a second-system excitation signal is 20 kHz. In FIG. 13, the ratio A of the number of turns on each of the teeth located at both ends in each system in example 1 is 2/3. Although each of comparative examples 1 and 2 is a redundant resolver having resolvers for two systems, the number of turns is the same among all the teeth. That is, the A is 1. In comparative example 1, excitation circuits of the two systems are independent of each other, and, in the same manner as in embodiment 1, the frequency f1 of a first-system excitation signal is 10 kHz and the frequency f2 of a second-system excitation signal is 20 kHz. In comparative example 2, although excitation circuits are independent of each other, the independence is achieved at the time when the phase difference therebetween is 0°, and the frequency of each of excitation signals to the resolvers in the two systems is 10 kHz. It is noted that, in example 1 and comparative example 1, each angle calculation unit eliminates a frequency component of the other system.

FIG. 14 is a diagram in which the redundant resolvers satisfying the three conditions shown in FIG. 13 are compared to one another in terms of the proportion of the electrical angle second-order component to the fundamental wave of the first-system first output signal. Firstly, comparative examples 1 and 2 are compared to each other as follows. That is, in comparative example 1 in which excitation signals having different frequencies are supplied from the two independent excitation circuits and each angle calculation unit has eliminated the frequency component of the other system, the electrical angle second-order component increases to about 1.4 times that in comparative example 2 in which the phase difference between the two excitation circuits is 0°. Increase in the electrical angle second-order component of the output signal causes increases in an electrical angle first-order component and an electrical angle third-order component. The increases in the electrical angle first-order component and the electrical angle third-order component of an angular error which is the difference between the true value of an angle and an angle detected by the redundant resolver, lead to reduction in the accuracy of angle detection.

Meanwhile, in example 1, the ratio A of the number of turns on each of the teeth located at both ends in each system is 2/3, and, as described above, the gap magnetic flux densities at both end portions of the first-system tooth block change mildly. It is found that this advantageous effect allows the electrical angle second-order component of the output signal to be less than in not only comparative example 1 but also comparative example 2 in which the phase difference between the excitation circuits is 0°.

FIG. 15 is a diagram in which comparison of angular error is made in terms of each of electrical angle first-order component and electrical angle third-order component under the conditions for example 1 and comparative example 2. FIG. 15 shows angular errors normalized with the value of the electrical angle first-order component in comparative example 2. It is seen that, in example 1, improvement is made in both the electrical angle first-order component and the electrical angle third-order component as compared to comparative example 2, whereby the angular errors are reduced.

Although the advantageous effects of the present embodiment 1 have been described above with reference to FIG. 14 and FIG. 15 with a focus placed on the first system, the same physical phenomenon occurs also for the second system, and thus description thereof will be omitted.

As described above, in the redundant resolver according to embodiment 1, the resolver in each system composing the redundant resolver is implemented by a tooth block for the system by dividing the stator in the circumferential direction, and thus the resolver body is not upsized. Further, the excitation circuits in the respective systems are formed to be independent of each other, the number of turns of the excitation winding wound on each of the teeth located at both end portions of the tooth block in each system is set to be smaller than the number of turns of the excitation winding wound on each of the teeth located at the portions other than both end portions, and the ratio A between both numbers is set to fall within a range of 2/7<A<1. Thus, the electrical angle second-order component to be superimposed on the output signal is reduced and the accuracy of angle detection is improved, as compared to the case where the number of turns is the same among the teeth in the system.

It is noted that, although excitation signals having different frequencies are supplied from the two independent excitation circuits and each angle calculation unit eliminates the frequency component of the other system in example 1 compared to comparative examples 1 and 2, the frequency may be set to be the same between the two independent excitation circuits as in comparative example 2 so that neither of the angle calculation units has to eliminate the frequency component of the other system. Since the advantageous effect of moderating the changes in the gap magnetic flux densities is exhibited by reducing the windings at both end portions of the tooth block in example 1, the electrical angle second-order component is made less than that in comparative example 2.

Further, in the first-system tooth block and the second-system tooth block, the numbers of turns on the teeth not located at both ends of the tooth blocks in the systems may be different between the systems as long as the numbers of turns on the teeth not located at both ends are the same within the tooth block in each system. The numbers of turns of the excitation windings on the teeth at both end portions and at the portions other than both end portions only have to be set such that the gap magnetic flux densities at both end portions in each system change mildly.

Embodiment 2

In the above embodiment 1, the number of turns of the excitation winding wound on each of the teeth located at both ends of the tooth block in each system is reduced so that the gap magnetic flux densities at said both end portions are set to change mildly. Consequently, the electrical angle second-order component to be superimposed on the output signal is reduced. In the present embodiment 2, the same advantageous effect is exhibited by changing the width of each of the teeth located at both ends of the tooth block in each system.

Hereinafter, a redundant resolver according to the present embodiment 2 will be described with reference to drawings.

Figure 16:
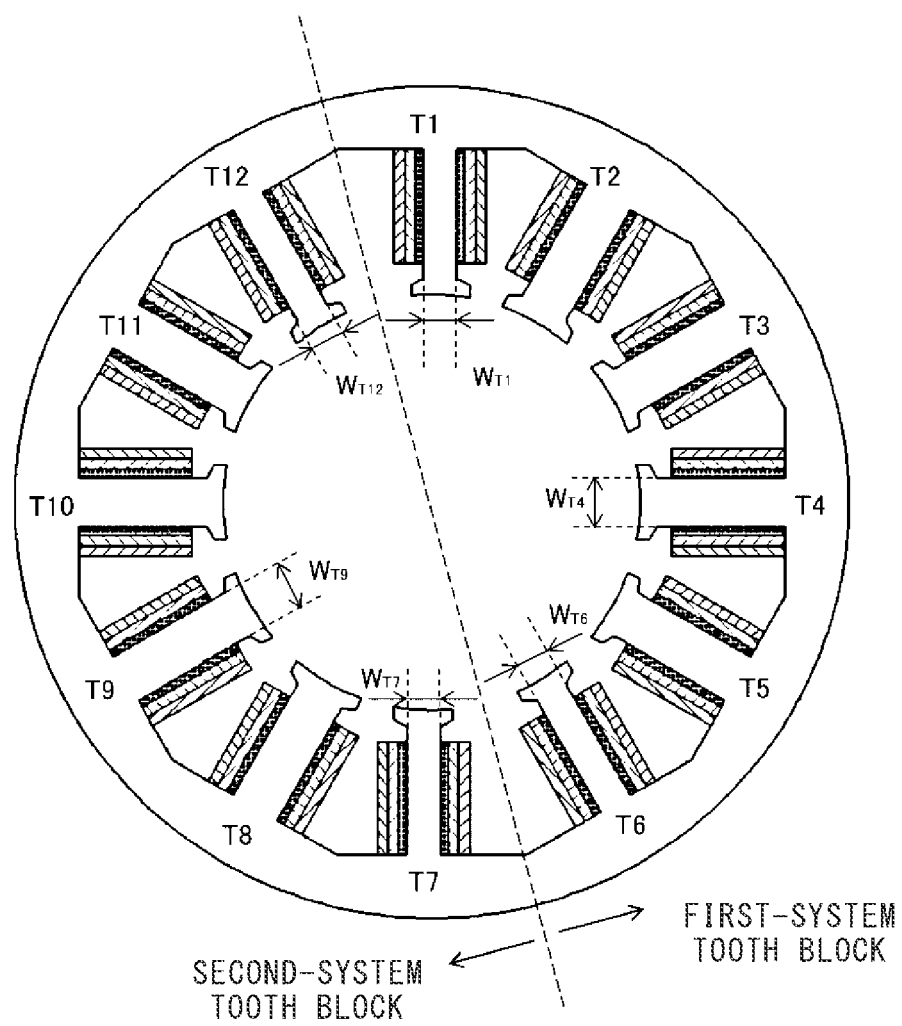
FIG. 16 is a cross-sectional view of a stator of a redundant resolver according to embodiment 2.

FIG. 16 is a cross-sectional view of a stator 3 of the redundant resolver according to embodiment 2 and illustrates a configuration of a part of a first system resolver 100a and a second-system resolver 100b. The configuration of the tooth block in each system and the manner of winding each excitation winding, each first output winding, and each second output winding are the same as those in embodiment 1, and thus description thereof will be omitted. In the stator 3 of the redundant resolver according to the present embodiment 2, the teeth T1 and T6 located at both ends of the first-system tooth block are thinner than the teeth T2, T3, T4, and T5 not located at said both ends. As shown in FIG. 16, the width of each tooth is represented by $W_{Ti}$ (i represents a tooth number), and, if the tooth T4 is used as an example of a tooth not located at both ends, $W_{T1}<W_{T4}$ and $W_{T6}<W_{T4}$ are satisfied.

Likewise, the width of each of the teeth T7 and T12 located at both ends of the second-system tooth block is smaller than the width of each of the teeth T8, T9, T10, and T11 not located at said both ends. As shown in FIG. 16, if the tooth T9 is used as an example of the tooth not located at both ends, $W_{T7}<W_{T9}$ and $W_{T12}<W_{T9}$ are satisfied.

Figure 17:
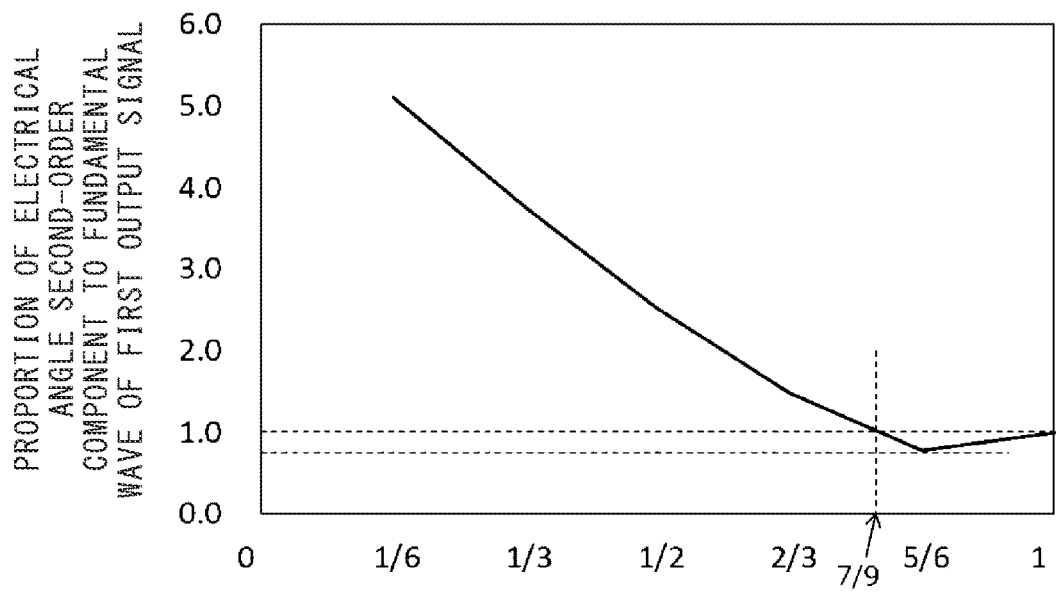
FIG. 17 illustrates changes in the electrical angle second-order component superimposed on the output signal with respect to the width of each of teeth located at both ends of a first-system tooth block, in the redundant resolver according to embodiment 2.

FIG. 17 illustrates the relationship between: the width of each of the teeth located at both ends of the first-system tooth block; and the proportion of the electrical angle second-order component to the fundamental wave for the first output windings. The horizontal axis represents the ratio of the width $W_{Ti}$ (i=1 and 6) of each of the teeth (teeth T1 and T6) located at both ends of the first-system tooth block to the width $W_{Ti}$ (i=2, 3, 4, and 5) of each of the teeth (teeth T2, T3, T4, and T5) not located at both ends of the first-system tooth block. This ratio is defined as B. The vertical axis represents the proportion of the electrical angle second-order component to the fundamental wave for the first-system first output windings. In the horizontal axis, B=1 means that all the teeth (teeth T1 to T6) in the first-system tooth block have the same width. The vertical axis is normalized with the value obtained at the time of B=1.

With a focus placed on B=1 in FIG. 17, as the width of each of the teeth (teeth T1 and T6) located at both ends of the first-system tooth block is made smaller, i.e., as the B is made lower, the proportion of the electrical angle second-order component to the fundamental wave of the first output signal becomes lower. If the proportion of the superimposed electrical angle second-order component is reduced, the angle detection error is reduced. However, if the width is significantly reduced such that the B becomes lower than 7/9, the effect of moderating the changes in the magnetic flux densities at both end portions is reduced. Consequently, the proportion of the superimposed electrical angle second-order component becomes higher than that at the time of B=1 at which the width is the same among all the teeth in the first-system tooth block. That is, at the time of 7/9<B<1, the electrical angle second-order component to be superimposed on the output signal can be made smaller than that obtained when the width is set in the same manner as in the comparative example. Further, judging from FIG. 17, the electrical angle second-order component to be superimposed on the output signal can be made minimum at the time of B=5/6.

Figure 18:
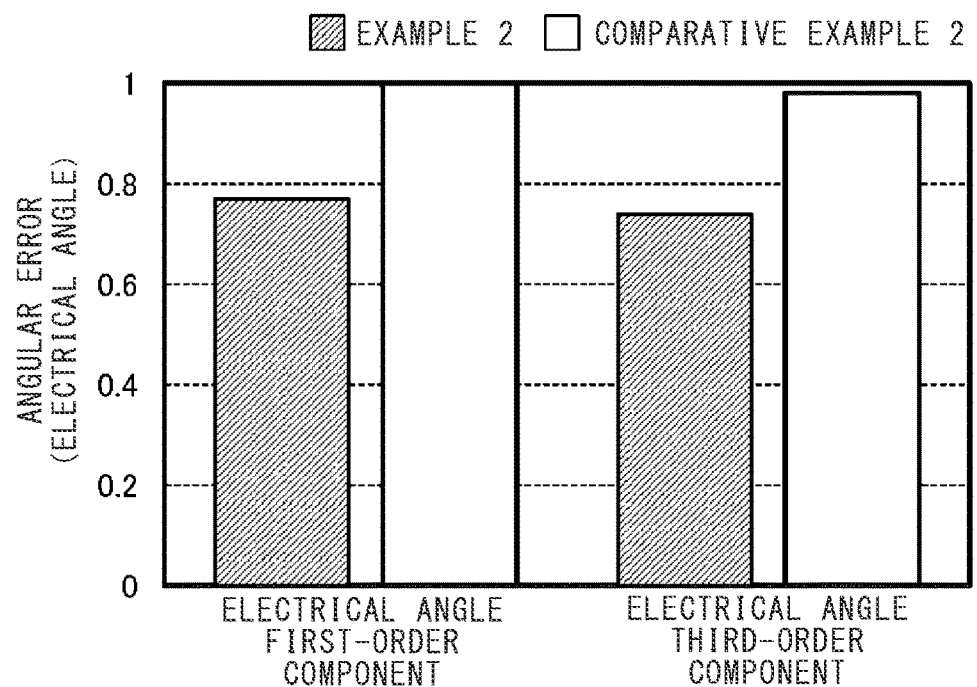
FIG. 18 illustrates the effect of reducing the angular error in the redundant resolver according to embodiment 2.

FIG. 18 illustrates an example of the effect of the redundant resolver according to embodiment 2.

Example 2 is obtained under conditions shown in FIG. 13. Specifically, example 2 is such that: in the same manner as in comparative example 2, the number of turns on each of the teeth at both end portions is set to be the same as the number of turns on each of the teeth not located at said both ends; and meanwhile, the width of each of the teeth at both end portions is set to be smaller than the width of each of the teeth not located at said both ends (B=5/6). FIG. 18 is a diagram in which comparison of angular error is made in terms of each of electrical angle first-order component and electrical angle third-order component under the conditions for example 2 and comparative example 2. FIG. 18 shows angular errors normalized with the value of the electrical angle first-order component in comparative example 2. It is seen that, in example 2 as well, improvement is made in both the electrical angle first-order component and the electrical angle third-order component as compared to comparative example 2, whereby the angular errors are reduced.

Description in embodiment 1 similarly applies here. Specifically, the width of each of the teeth located at both ends of the first-system tooth block is smaller than the width of each of the other teeth of the first-system tooth block, and the B falls within the range of 7/9<B<1. Consequently, magnetomotive forces at the teeth T1 and T6 located at both end portions of the first-system tooth block are weakened, and the gap magnetic flux densities at both end portions of the first-system tooth block change more mildly than in comparative example 2 in which the teeth T1 and T6 located at both ends also have the same width. Therefore, the electrical angle second-order component to be superimposed on the output signal is reduced. Further, the electrical angle first-order component and the electrical angle third-order component are also reduced, whereby the angular error is reduced.

It is noted that, although the advantageous effects of the present embodiment 2 have been described with reference to FIG. 17 and FIG. 18 with a focus placed on the first system, the same physical phenomenon occurs also for the second system, and thus description thereof will be omitted.

As described above, in the redundant resolver according to embodiment 2, the same advantageous effects as those in embodiment 1 are exhibited. That is, since the width of each of the teeth located at both ends of the tooth block in each system is made smaller than the width of each of the teeth not located at said both ends and the ratio B between both widths is set to fall within the range of 7/9<B<1, the electrical angle second-order component to be superimposed on the output signal is reduced and the accuracy of angle detection is improved, as compared to the case where the teeth in each system have the same width.

It is noted that, although excitation signals having different frequencies are supplied from the two independent excitation circuits and each angle calculation unit eliminates the frequency component of the other system in example 2 compared to comparative example 2, the frequency may be set to be the same between the two independent excitation circuits as in comparative example 2 so that neither of the angle calculation units has to eliminate the frequency component of the other system. Since the advantageous effect of moderating the changes in the gap magnetic flux densities is exhibited by reducing the width of each of the teeth at both end portions of the tooth block in example 2, the electrical angle second-order component is made less than that in comparative example 2.

Further, in the first-system tooth block and the second-system tooth block, the widths of the teeth not located at both ends of the tooth blocks in the systems may be different between the systems as long as the widths of the teeth not located at both ends are the same within the tooth block in each system. The width of each of the teeth at both end portions and at the portions other than both end portions only has to be set such that the gap magnetic flux densities at both end portions in each system change mildly.

Embodiment 3

In embodiment 1, the number of turns of the excitation winding wound on each of the teeth located at both ends of the tooth block in each system is reduced, and, embodiment 2, the width of each of the teeth located at both ends of the tooth block in each system is changed, so that the gap magnetic flux densities at said both end portions are set to change mildly. Consequently, the electrical angle second-order component to be superimposed on the output signal is reduced. In the present embodiment 3, the same advantageous effect is exhibited by increasing the gap length between the rotor and each of the teeth located at both ends of the tooth block in each system.

Hereinafter, a redundant resolver according to the present embodiment 3 will be described with reference to drawings.

Figure 19:
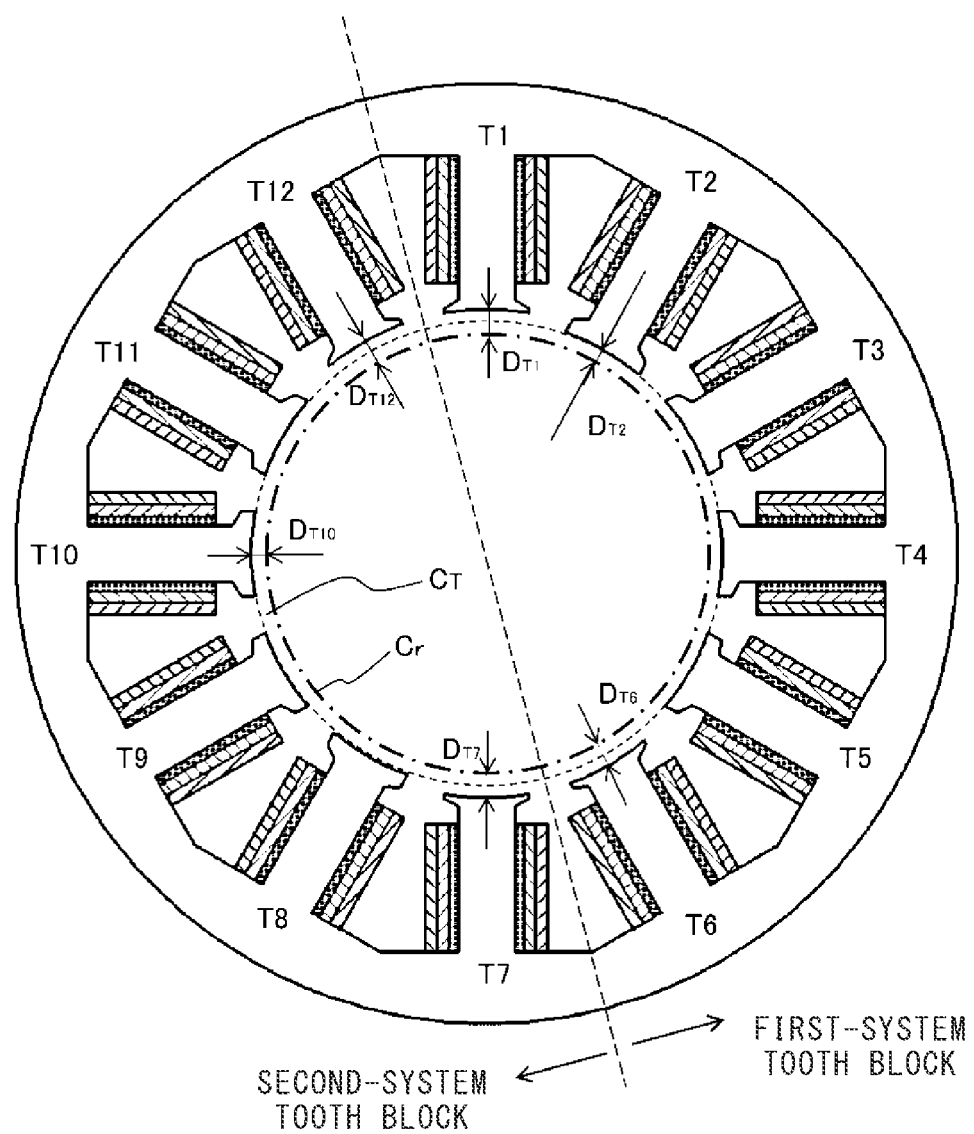
FIG. 19 is a cross-sectional view of a stator of a redundant resolver according to embodiment 3.

FIG. 19 is a cross-sectional view of a stator 3 of the redundant resolver according to embodiment 3 and illustrates a configuration of a part of a first system resolver 100a and a second-system resolver 100b. The configuration of the tooth block in each system and the manner of winding each excitation winding, each first output winding, and each second output winding are the same as those in embodiments 1 and 2, and thus description thereof will be omitted.

In the stator 3 of the redundant resolver according to the present embodiment 3, end portions of the teeth T1 and T6 located at both ends of the first-system tooth block are located on an outer circumferential side relative to end portions of the teeth T2, T3, T4, and T5 not located at said both ends. Therefore, the gap length between the rotor and each of the teeth T1 and T6 located at both ends of the first-system tooth block is larger than the gap length between the rotor and each of the teeth T2, T3, T4, and T5 not located at said both ends.

In FIG. 19, a circle $C_r$ drawn with the alternate long and short dash line indicates the trajectory, of the salient pole portions 2$p$, that is formed when the rotor is rotated, and a circle $C_T$ drawn with the broken line connects surfaces of the teeth not located at both ends, the surfaces being opposed to the rotor. As shown in FIG. 19, the gap length between each tooth and the rotor is defined as $D_{Ti}$ (i represents a tooth number), and, if the tooth T2 is used as an example of the tooth not located at both ends, $D_{T1} > D_{T2}$ and $D_{T6} > D_{T2}$ are satisfied. It is noted that the gap length (represented by $D_{T2}$) between the rotor and the tooth not located at both ends is a value obtained by subtracting the radius of the circle $C_r$ from the radius of the circle $C_T$.

Likewise, end portions of the teeth T7 and T12 located at both ends of the second-system tooth block are located on an outer circumferential side relative to end portions of the teeth T8, T9, T10, and T11 not located at said both ends. Therefore, a gap length between the rotor and each of the teeth T7 and T12 located at both ends of the second-system tooth block is larger than the gap length between the rotor and each of the teeth T8, T9, T10, and T11 not located at said both ends. As shown in FIG. 19, if the tooth T10 is used as an example of the tooth not located at both ends, $D_{T7} > D_{T10}$ and $D_{T12} > D_{T10}$ are satisfied.

In the redundant resolver according to embodiment 3, the gap length of each of the teeth T1 and T6 located at both ends of the first-system tooth block is larger than the gap length of each of the other teeth T2, T3, T4, and T5. Consequently, magnetomotive forces are weakened, and the gap magnetic flux densities at both end portions of the first-system tooth block change mildly. Thus, the electrical angle second-order component to be superimposed on the output signal is reduced. Therefore, the effect of reducing the electrical angle first-order component and the electrical angle third-order component of the angular error can be obtained. In addition, the gap length of each of the teeth T7 and T12 located at both ends of the second-system tooth block is larger than the gap length of each of the other teeth T8, T9, T10, and T11. Consequently, magnetomotive forces are weakened, and the gap magnetic flux densities at both end portions of the second-system tooth block change mildly. Thus, the electrical angle second-order component to be superimposed on the output signal is reduced. Therefore, the effect of reducing the electrical angle first-order component and the electrical angle third-order component of the angular error can be obtained.

As described above, in the redundant resolver according to embodiment 3, the same advantageous effects as those in embodiments 1 and 2 are exhibited. That is, since the gap length of each of the teeth located at both ends of the tooth block in each system is made larger than the gap length of each of the teeth not located at said both ends, the electrical angle second-order component to be superimposed on the output signal is reduced and the accuracy of angle detection is improved, as compared to the case where the gap length of each of the teeth in each system have the same gap length.

In addition, embodiments 1 to 3 may be combined such that, in the tooth block in each system, the gap magnetic flux densities at both end portions change mildly. For example, in the tooth block in each system, each of the teeth located at both ends of the tooth block in the system may be set to have a smaller width and a smaller number of turns of the excitation winding than each of the teeth not located at said both ends, within a range that allows the gap magnetic flux densities at said both end portions to change mildly. In the tooth block in each system, each of the teeth located at both ends of the tooth block in the system may be set to have a smaller width, a smaller number of turns of the excitation winding, and a larger gap length than each of the teeth not located at said both ends, within the range that allows the gap magnetic flux densities at said both end portions to change mildly.

It is noted that, in embodiments 1 to 3, the first-system teeth which are the tooth T1 to the tooth T6 compose the first-system tooth block, and the second-system teeth which are the tooth T7 to the tooth T12 compose the second-system tooth block. The first-system tooth block and the second-system tooth block may each be integrally formed or may be integrated with each other. Alternatively, integration may be achieved through manufacturing steps such as: integrally forming each of the tooth blocks; and then integrating both tooth blocks with each other. Further, among pieces including teeth T and yokes Y or a laminate of the pieces, the yokes may be connected to form the tooth blocks in the respective systems.

Further, although examples in which the number Ns of the teeth T of the stator 3 is 12 and the number Nx of the salient poles of the rotor is 5 have been described in embodiments 1 to 3, the present disclosure is not limited to these examples.

Embodiment 4

Hereinafter, a redundant resolver according to embodiment 4 will be described with reference to drawings. Although examples in which the teeth (T1 to T12) of the stator are divided in the circumferential direction into two blocks have been described in the above embodiments 1 to 3, the present disclosure is not limited to these examples.

Figure 20:
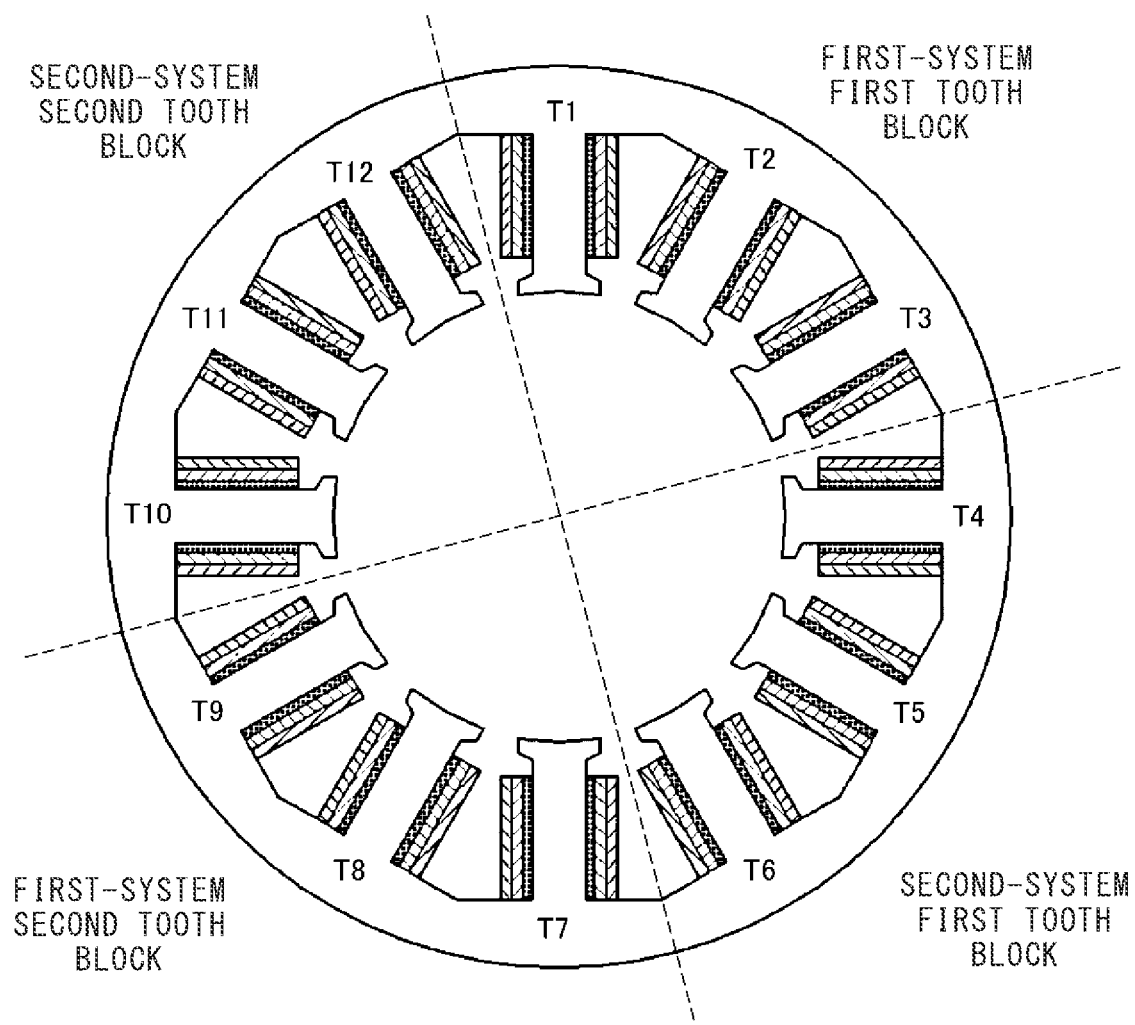
FIG. 20 is a cross-sectional view of a stator of a redundant resolver according to embodiment 4.

FIG. 20 is a cross-sectional view of a stator of the redundant resolver according to the present embodiment 4. In the resolver according to the present embodiment 4, the number Ns of the teeth of the stator is 12, and the shaft angle multiplier Nx of the rotor is 5. The teeth (T1 to T12) of the stator are divided in the circumferential direction into four blocks. The blocks are, in order in the circumferential direction, referred to as a first-system first tooth block, a second-system first tooth block, a first-system second tooth block, and a second-system second tooth block. The first-system first tooth block and the first-system second tooth block are connected in series to compose a first system. Likewise, the second-system first tooth block and the second-system second tooth block are connected in series to compose a second system. These two systems compose a duplex redundant resolver.

It is noted that any of the configurations in embodiments 1 to 3 is used for each tooth block in order to moderate the changes in the gap magnetic flux densities at both end portions in the tooth block and reduce the electrical angle second-order component to be superimposed on the output signal. That is, the configuration is any of: a configuration in which the number of turns of the excitation winding wound on each of the teeth located at both ends in the tooth block is reduced by a predetermined number; a configuration in which the width of each of the teeth located at both ends in the tooth block is reduced by a predetermined amount; or a configuration in which the gap length of each of the teeth located at both ends in the tooth block is increased. In addition, the configurations described in embodiments 1 to 3 may be combined such that: the gap magnetic flux densities at both end portions in the tooth block can be set to change mildly; and the electrical angle second-order component to be superimposed on the output signal can be reduced.

In addition, the first-system first tooth block, the first-system second tooth block, the second-system first tooth block, and the second-system second tooth block may each be integrally formed or may be combined during manufacturing. Further, two or more of the tooth blocks may be integrated with each other.

In this manner, the stator is divided in the circumferential direction into four blocks, the angle of each tooth block with respect to the circumference is set to be 90 degrees, and the teeth composing one system are arranged at locations opposed to each other. Consequently, imbalance of magnetic flux caused if the stator or the rotor is decentered is mitigated, and the output signal has the shape of a sine wave with little distortion, whereby the accuracy of angle detection can be improved.

It is noted that, although an example in which the number Ns of the teeth T of the stator 3 is 12 and the number Nx of the salient poles of the rotor is 5 has been described, the present disclosure is not limited to this example, and the number of tooth blocks obtained by division of the stator in the circumferential direction is not limited to 2 or 4, either. If the number of tooth blocks obtained by division of the stator in the circumferential direction is defined as M and the number of systems is defined as N (N represents an integer of 2 or more), M≥N is satisfied, and, with increase in the number of teeth, the number of teeth belonging to each tooth block obtained by division only has to be 3 or more. In this case, the total number of teeth only has to be the same among the systems, and adjacent tooth blocks only have to belong to different systems. The phrase "the total number of teeth is the same among the systems" means that the sum of division angles of the tooth block with respect to the circumference is the same among the systems and is 360/N degrees.

Embodiment 5

The redundant resolvers described above can be applied to an electric power steering device for vehicles.

Hereinafter, an electric power steering device according to embodiment 5 will be described with reference to a drawing.

Figure 21:
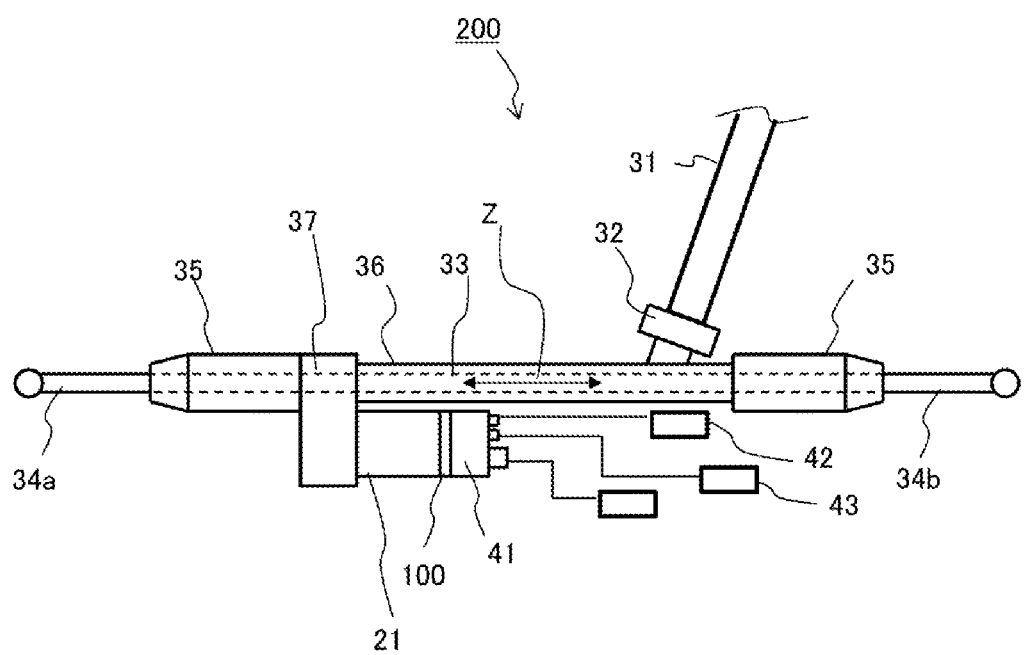
FIG. 21 is a schematic configuration diagram of an electric power steering device according to embodiment 5.

FIG. 21 is a schematic configuration diagram of an electric power steering device 200 mounted in a vehicle such as an automobile. In FIG. 21, a steering wheel (not shown) to be steered by a driver is connected to one end of a shaft 31. When the driver steers the steering wheel, the torque thereof is transmitted to the shaft 31. The shaft 31 is connected to a rack shaft 33 inside a housing 36. A front right wheel tie rod 34a and a front left wheel tie rod 34b are respectively connected to both ends of the rack shaft. A right wheel (not shown) is connected via a knuckle arm (not shown) to the front right wheel tie rod 34a. A left wheel (not shown) is connected via a knuckle arm (not shown) to the front left wheel tie rod 34b. The orientations of the left and right front wheels are changed according to steering of the steering wheel by the driver. It is noted that rack boots 35 are provided to prevent foreign matter from entering this device.

The electric power steering device 200 assists the driver in steering of the steering wheel. When the driver steers the steering wheel so that a steering torque has been generated, this assist is performed by generating a supplementary torque that supplements the steering torque. The supplementary torque is generated while the rotary electric machine 21 which is, for example, a permanent magnet type rotary electric machine serves as a power source.

When the driver steers the steering wheel, the torque thereof is detected by a torque sensor 32 provided to the shaft 31. The detected torque is transmitted to a first-system power supply source 42 and a second-system power supply source 43. In addition, information about the vehicle such as a vehicle speed, which has been converted into an electrical signal, is also transmitted to the first-system power supply source 42 and the second-system power supply source 43. Each of the first-system power supply source 42 and the second-system power supply source 43 calculates a necessary assist torque from the detected torque and the information about the vehicle such as the vehicle speed and supplies current to the rotary electric machine 21 through a control device 41 (inverter) for the rotary electric machine 21.

The rotary electric machine 21 is disposed to be oriented parallel to a motion direction (arrow Z) of the rack shaft 33. A torque generated in the rotary electric machine is transmitted to a belt (not shown) and a ball screw in a gearbox 37 so that thrust force for moving the rack shaft 33 inside the housing 36 in the direction indicated by the arrow Z is generated. The thrust force provides assist for the steering force generated by the driver. The front right wheel tie rod 34a and the front left wheel tie rod 34b are operated by the thrust force generated by the rotary electric machine and the steering force generated by the driver. Accordingly, the orientations of both wheels are changed, whereby the vehicle can be turned. Since assist is provided by the torque from the rotary electric machine in this manner, the driver can cause the vehicle to turn with a small steering force.

In the electric power steering device 200 according to the present embodiment, the redundant resolver 100 in any of the above embodiments 1 to 4 is applied for detecting the rotation angle of the rotary electric machine 21. In the electric power steering device, cogging torque and torque ripple generated in the rotary electric machine are transmitted via a gear to the driver, and thus cogging torque and torque ripple are desirably set to be small in order to obtain favorable steering feeling. In addition, vibrations and noises at the time of operation of the rotary electric machine are also desirably set to be small. By accurately detecting the rotation angle of the rotary electric machine, the rotary electric machine can be smoothly controlled. Thus, generation of torque ripple can be suppressed as compared to the case where the accuracy of rotation angle detection is low. The same applies to vibrations and noises as well. Therefore, the electric power steering device 200 according to the present embodiment in which the redundant resolver 100 in any of the above embodiments 1 to 4 is mounted to the rotary electric machine 21 can provide favorable steering feeling to the driver.

Meanwhile, if the electric power steering device fails, the operability of the steering wheel by the driver is reduced. However, the electric power steering device 200 according to the present embodiment is provided with the redundant resolver 100 in any of embodiments 1 to 4 having redundancy, and thus, even if one of the systems fails, the rotation angle can be detected with high accuracy by the other system so that assist force can be continuously outputted.

It is noted that, although FIG. 21 shows the rotary electric machine 21 mounted with the redundant resolver 100, it is needless to say that: the body 1 of the redundant resolver can be mounted in the rotary electric machine; and the control device 41 can be provided outside the rotary electric machine 21.

Figure 22:
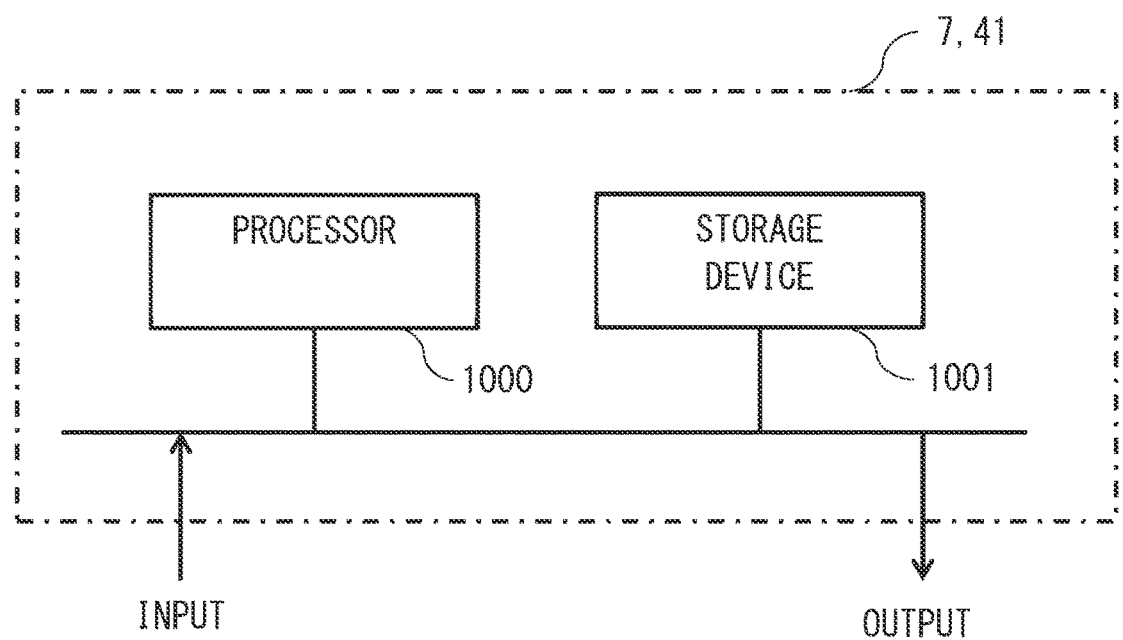
FIG. 22 is a hardware configuration diagram of the control unit and the control device.

FIG. 22 shows an example of hardware of the control unit 7 and control device 41. Each of the control unit 7 and control device 41 is composed of a processor 1000 and a storage unit 1001 as shown in FIG. 22. The storage unit 1001 includes, although not shown, a volatile storage device such as a random access memory, and a nonvolatile auxiliary storage device such as a flash memory. The storage unit 1001 may include, instead of a flash memory, an auxiliary storage device such as a hard disk. The processor 1000 executes a program loaded from the storage unit 1001. In this case, the program is loaded from the auxiliary storage device to the processor 1000 via the volatile storage device. The processor 1000 may output data of the calculation result and the like to the volatile storage device of the storage unit 1001, or may store the data in the auxiliary storage device via the volatile storage device. It is noted that, the angle calculation unit 5 may be composed of a processor 1000 and a storage unit 1001 as shown in FIG. 22.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 resolver body
2 rotor
3 stator
4, 4a, 4b winding
5 angle calculation unit
6 excitation circuit
7 control circuit
21 rotary electric machine
22 shaft
31 shaft
32 torque sensor
33 rack shaft
34a front right wheel tie rod
34b front left wheel tie rod
35 rack boot
36 housing
37 gearbox
41 control device
42 first-system power supply source
43 second-system power supply source
100 redundant resolver
100a first-system resolver
100b second-system resolver
200 electric power steering device
Sa first output winding
Sb second output winding
R excitation winding
T tooth
$W_{Ti}$ width of tooth
$D_{Ti}$ gap length

The invention claimed is:

1. A redundant resolver comprising:
a resolver body having a rotor having Nx (Nx represents a natural number) salient poles,
a stator opposed to the rotor and having Ns (Ns represents an integer of 2 or more) teeth arranged in a circumferential direction, and
an excitation winding and two phases of output windings, the excitation winding and the output windings being wound on each tooth of the stator;
an excitation circuit configured to supply power to the excitation winding; and
an angle calculator to calculate a rotation angle of a rotary body provided with the rotor, on the basis of signals from the two phases of output windings, wherein
the stator is divided in the circumferential direction into M pieces which serve as M tooth blocks, N (N represents an integer of 2 or more and satisfies M≥N) redundancy systems are formed on the basis of the M tooth blocks, and a sum of division angles in each system is 360/N degrees,
the excitation circuit is provided to each system so as be independent among the systems, and the angle calculation unit is also provided to each system so as be independent among the systems, and
in each tooth block, the teeth located at both ends of the tooth block have the excitation winding and at least one of the two phases output windings, and the number of turns of the excitation winding wound on each of the teeth located at both ends of the tooth block is made less than the number of turns of the excitation winding wound on each of the teeth not located at said both ends.

2. The redundant resolver according to claim 1, wherein, if a proportion of the number of turns of the excitation winding wound on each of the teeth located at both ends of the tooth block to the number of turns of the excitation winding wound on each of the teeth not located at said both ends is defined as A, 2/7<A<1 is satisfied.

3. The redundant resolver according to claim 2, wherein, if the proportion of the number of turns of the excitation winding wound on each of the teeth located at both ends of the tooth block to the number of turns of the excitation winding wound on each of the teeth not located at said both ends is defined as A, A=2/3 is satisfied.

4. The redundant resolver according to claim 1, wherein the excitation circuits supply power to the excitation windings with use of excitation frequencies that differ between the systems.

5. The redundant resolver according to claim 1, wherein the angle calculation provided to each system eliminates an excitation signal component of another one of the systems.

6. The redundant resolver according to claim 1, wherein M=2 and N=2 are satisfied, and
the stator is divided into two blocks to form two systems.

7. The redundant resolver according to claim 1, wherein M=4 and N=2 are satisfied, the stator is divided in the circumferential direction into four blocks to form two systems, and tooth blocks of a same one of the systems are disposed to be opposed to each other.

8. An electric power steering device comprising a rotary electric machine for generating a supplementary torque that supplements a steering torque in a vehicle, the electric power steering device being mounted with the redundant resolver according to claim 1.

9. A redundant resolver comprising:

a resolver body having a rotor having Nx (Nx represents a natural number) salient poles, a stator opposed to the rotor and having Ns (Ns represents an integer of 2 or more) teeth arranged in a circumferential direction, and an excitation winding and two phases of output windings, the excitation winding and the output windings being wound on each tooth of the stator;

an excitation circuit configured to supply power to the excitation winding; and an angle calculator to calculate a rotation angle of a rotary body provided with the rotor, on the basis of signals from the two phases of output windings, wherein the stator is divided in the circumferential direction into M pieces which serve as M tooth blocks, N (N represents an integer of 2 or more and satisfies M≥N) redundancy systems are formed on the basis of the M tooth blocks, and a sum of division angles in each system is 360/N degrees, the excitation circuit is provided to each system so as be independent among the systems, and the angle calculation unit is also provided to each system so as be independent among the systems, and in each tooth block, the teeth located at both ends of the tooth block have the excitation winding and at least one of the two phases of output windings, and a width of each of the teeth located at both ends of the tooth block is made less than a width of each of the teeth not located at said both ends.

10. The redundant resolver according to claim 9, wherein, if a proportion of the width of each of the teeth located at both ends of the tooth block to the width of each of the teeth not located at said both ends is defined as B, 7/9<B<1 is satisfied.

11. The redundant resolver according to claim 10, wherein, if the proportion of the width of each of the teeth located at both ends of the tooth block to the width of each of the teeth not located at said both ends is defined as B, B=5/6 is satisfied.

12. The redundant resolver according to claim 9, wherein the excitation circuits supply power to the excitation windings with use of excitation frequencies that differ between the systems.

13. The redundant resolver according to claim 9, wherein the angle calculator provided to each system eliminates an excitation signal component of another one of the systems.

14. An electric power steering device comprising a rotary electric machine for generating a supplementary torque that supplements a steering torque in a vehicle, the electric power steering device being mounted with the redundant resolver according to claim 9.

15. A redundant resolver comprising:

a resolver body having a rotor having Nx (Nx represents a natural number) salient poles, a stator opposed to the rotor and having Ns (Ns represents an integer of 2 or more) teeth arranged in a circumferential direction, and an excitation winding and two phases of output windings, the excitation winding and the output windings being wound on each tooth of the stator;

an excitation circuit configured to supply power to the excitation winding; and an angle calculator to calculate a rotation angle of a rotary body provided with the rotor, on the basis of signals from the two phases of output windings, wherein the stator is divided in the circumferential direction into M pieces which serve as M tooth blocks, N (N represents an integer of 2 or more and satisfies M≥N) redundancy systems are formed on the basis of the M tooth blocks, and a sum of division angles in each system is 360/N degrees, the excitation circuit is provided to each system so as be independent among the systems, and the angle calculation unit is also provided to each system so as be independent among the systems, and in each tooth block, the teeth located at both ends of the tooth block have the excitation winding and at least one of the two phases of output windings, and a gap length between the rotor and each of the teeth located at both ends of the tooth block is made larger than a gap length between the rotor and each of the teeth not located at said both ends.

16. The redundant resolver according to claim 15, wherein the excitation circuits supply power to the excitation windings with use of excitation frequencies that differ between the systems.

17. The redundant resolver according to claim 15, wherein the angle calculator provided to each system eliminates an excitation signal component of another one of the systems.

18. An electric power steering device comprising a rotary electric machine for generating a supplementary torque that supplements a steering torque in a vehicle, the electric power steering device being mounted with the redundant resolver according to claim 15.

\* \* \* \* \*